(12) United States Patent
Liu et al.

(10) Patent No.: US 11,194,806 B2
(45) Date of Patent: Dec. 7, 2021

(54) OBJECT ENCODING AND COMPUTATION METHOD IN DATABASE SYSTEM AND DATABASE SERVER

(71) Applicant: Huawei Technologies Co., Ltd., Shenzhen (CN)

(72) Inventors: Huijun Liu, Shenzhen (CN); Cong Meng, Beijing (CN); Chaowei Zhang, Xi'an (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 32 days.

(21) Appl. No.: 16/559,245

(22) Filed: Sep. 3, 2019

(65) Prior Publication Data

US 2019/0391978 A1 Dec. 26, 2019

Related U.S. Application Data

(63) Continuation of application No. PCT/CN2018/077164, filed on Feb. 24, 2018.

(30) Foreign Application Priority Data

Mar. 2, 2017 (CN) .......................... 201710121672.1

(51) Int. Cl.
*G06F 16/2453* (2019.01)
*G06F 16/22* (2019.01)

(52) U.S. Cl.
CPC ...... *G06F 16/24542* (2019.01); *G06F 16/221* (2019.01); *G06F 16/2282* (2019.01)

(58) Field of Classification Search
CPC ........ G06F 16/134; G06F 16/22; G06F 16/24; G06F 16/2282; G06F 16/24542

(Continued)

(56) References Cited

U.S. PATENT DOCUMENTS 5,317,742 A * 5/1994 Bapat .................... G06F 16/289
 707/714
7,647,329 B1 * 1/2010 Fischman ............. G06F 3/0607
 707/999.1

(Continued)

FOREIGN PATENT DOCUMENTS

CN 1530860 A 9/2004
CN 101419600 A 4/2009

(Continued)

OTHER PUBLICATIONS

Foreign Communication From a Counterpart Application, European Application No. 18760336.0, Extended European Search Report dated Jan. 7, 2020, 9 pages.

(Continued)

*Primary Examiner* — Hung T Vy

(74) *Attorney, Agent, or Firm* — Conley Rose, P.C.

(57) ABSTRACT

An object encoding and computation method in a database system, where a global object sample space is constituted based on correlation between a plurality of object sample spaces in a database. A global dictionary table is created in the global object sample space to provide a globally unique encoding value for each object, set the encoding value as an object identifier (ID) of the object, and ensure that the object ID and object description information are in a one-to-one mapping relationship. The database object is encoded and compressed based on the global dictionary table. Further, the object ID is directly used for database query computation.

20 Claims, 19 Drawing Sheets

(58) Field of Classification Search
USPC .......................................................... 707/718
See application file for complete search history.

(56) References Cited

U.S. PATENT DOCUMENTS

| | | | |
|---|---|---|---|
| 2002/0035432 A1 | 3/2002 | Kubica et al. | |
| 2002/0087545 A1 | 7/2002 | Bright et al. | |
| 2002/0169767 A1* | 11/2002 | Harvey | G06F 16/289 |
| 2004/0244039 A1 | 12/2004 | Sugahara et al. | |
| 2010/0034206 A1 | 2/2010 | Xue et al. | |
| 2011/0199243 A1 | 8/2011 | Fallon et al. | |
| 2014/0046928 A1 | 2/2014 | Konik et al. | |
| 2015/0169656 A1 | 6/2015 | Ito et al. | |
| 2016/0104016 A1 | 4/2016 | Deal et al. | |
| 2017/0249393 A1* | 8/2017 | Nair | G06F 16/25 |

FOREIGN PATENT DOCUMENTS

| | | |
|---|---|---|
| CN | 101626563 A | 1/2010 |
| CN | 102436479 A | 5/2012 |
| CN | 102685221 A | 9/2012 |
| CN | 103324733 A | 9/2013 |
| CN | 103326732 A | 9/2013 |
| CN | 103942234 A | 7/2014 |
| CN | 104346377 A | 2/2015 |
| CN | 105045577 A | 11/2015 |
| EP | 2833277 A1 | 2/2015 |

OTHER PUBLICATIONS

Machine Translation and Abstract of Chinese Publication No. CN103324733, Sep. 25, 2013, 9 pages.
Machine Translation and Abstract of Chinese Publication No. CN103326732, Sep. 25, 2013, 36 pages.
Machine Translation and Abstract of Chinese Publication No. CN103942234, Jul. 23, 2014, 16 pages.
Machine Translation and Abstract of Chinese Publication No. CN104346377, Feb. 11, 2015, 25 pages.
Foreign Communication From a Counterpart Application, PCT Application No. PCT/CN2018/077164, English Translation of International Search Report dated May 30, 2018, 2 pages.
Foreign Communication From a Counterpart Application, PCT Application No. PCT/CN2018/077164, English Translation of Written Opinion dated May 30, 2018, 3 pages.
Zhang, Y., "GPU Adaptive Hybrid OLAP Query Processing Model," Journal of Software, 2016, vol. 27, No. 5, pp. 1246-1265.
Park, S., et al., "Examining success factors in the adoption of digital object identifier systems," Electronic Commerce Research and Applications, vol. 10, Issue 6, Nov.-Dec. 2011, pp. 626-636.

* cited by examiner

OBJECT ENCODING AND COMPUTATION METHOD IN DATABASE SYSTEM AND DATABASE SERVER

CROSS-REFERENCE TO RELATED APPLICATIONS

The present application is a continuation of International Patent Application No. PCT/CN2018/077164 filed on Feb. 24, 2018, which claims priority to Chinese Patent Application No. 201710121672.1 filed on Mar. 2, 2017. The disclosures of the aforementioned applications are hereby incorporated by reference in their entireties.

TECHNICAL FIELD

The present disclosure relates to the field of database technologies, and in particular, to an object encoding and computation method in a database system, a database management system, and a database server.

BACKGROUND

Modern information processing is on a basis of an object identifier (ID)-based recognition model. In the recognition model, an object in any sample space has an ID in order to be differentiated from another object in the sample space, and then the object is described using a human language. Therefore, each object has two basic attributes, an object ID and object description information. To be specific, any object may be represented as Object=(ID, description). Information processing based on the recognition model mainly includes, (1) creating an object sample space, (2) providing an encoding value for each object in the object sample space through manual/automatic encoding, to identify the object with a unique ID, and storing human language description information of the object, and (3) participating in various types of information computation based on information processing logic using information {Object=(ID, description)}.

A database processes data based on the foregoing recognition model. For example, a commercial database usually uses a dictionary table to encode/decode various strings/texts, and then participates in various types of query computation. Data in the column constitutes an object sample space if the database uses a dictionary table for a specific column in a source data file. When data is imported, the database selects a corresponding encoding algorithm to encode each object in the column to generate a unique ID and store the ID into a physical file of a data table. In the source data file, other data provided in the column corresponds to description information of the object in the column. In addition, the table has a private dictionary table for decoding, and the private dictionary table stores mapping information of the object in the column. For example, the following encoded values (object IDs) are obtained after a column "branch name" in the source data file is encoded.

| Object ID | Branch name (description) |
|---|---|
| 0001 | XX Bank (Branch A) |
| 0002 | XX Bank (Branch B) |
| 0003 | XX Bank (Branch C) |
| ... | ... |

Finally, when participating in various types of query computation, the database first loads the encoded value of the column, reversely queries the private dictionary table of the column to obtain description information of each object in the column, and then performs subsequent query computation based on the description information.

It can be learnt from the foregoing description that, each column in the database table uses a private dictionary table in an encoding process, and consequently encoding consumption is increased and disk storage space is wasted. In addition, because each column uses its own private dictionary table, encoding information cannot be shared among a plurality of correlated tables, and an obtained encoded value (an object ID) cannot be universally used for different tables. When the database is to participate in query computation, description information of all objects needs to be obtained based on a private dictionary table before various types of complex computation are performed on the description information. This seriously degrades query computation performance of the database.

SUMMARY

The present disclosure provides a method for encoding an object in a database, a method for performing query computation on an object in a database, a database management system, and a database server such that the object in the database can be encoded using a global dictionary table, and further an object ID is directly used to participate in various types of information processing computation, to improve database performance.

According to a first aspect, a method for encoding an object in a database is provided, including determining a global object sample space based on correlation between a plurality of object sample spaces in the database, creating a global dictionary table based on the global object sample space, where the global dictionary table includes an object ID and object description information of each object in the global object sample space, the object ID of each object is unique in the global object sample space, the object ID and the object description information are in a one-to-one mapping relationship in the global dictionary table, and the global dictionary table provides an encoding interface, and calling the encoding interface in the global dictionary table to encode at least one object in the database to obtain an encoding value of the at least one object, where the encoding value of the at least one object is an object ID of the at least one object.

According to the foregoing method, the correlation between the plurality of object sample spaces is taken into full consideration. The global dictionary table is created for the global object sample space. The global dictionary table is shared by the plurality of object sample spaces (for example, a plurality of tables) through share encoding. Therefore, the global dictionary table can provide globally unique encoding values for objects in these sample spaces, and the encoding value and the object description information are in a one-to-one mapping relationship such that creation of a plurality of local dictionary tables is avoided, encoding consumption is reduced, and disk space is saved.

In a possible design, a same type of objects in the database constitute an object sample space, and the objects include a tuple, a column, or a row. In another possible design, an object sample space may be a set of some data in the database, such as a table, a column of data in a table, or a plurality of columns of data in a plurality of tables. Therefore, the plurality of tables or columns in the database can share the global dictionary table such that creation of a plurality of local dictionary tables is avoided, encoding consumption is reduced, and disk space is saved.

In a possible design, determining a global object sample space based on correlation between a plurality of object sample spaces in the database includes determining at least two correlated columns in the database, where the at least two columns constitute the global object sample space.

In a possible design, the at least two correlated columns include at least two columns that are synchronously operated during query computation.

In a possible design, the global dictionary table provides an operation interface, and the method further includes calling the operation interface to perform an operation on the global dictionary table, where the operation includes at least one operation of query, updating, deletion, partition, and import. In this way, the global dictionary table can be updated dynamically.

In a possible design, the method further includes storing encoded data in a data store after calling the encoding interface in the global dictionary table to encode the object of the database.

In a possible design, the global dictionary table is one of a data file, a memory table, a database table, and an index table. The global dictionary table may be stored in an external storage, and is loaded into a memory when the global dictionary table is to be used.

According to a second aspect, a method for performing query computation based on an object ID is provided, including receiving a structured query language (SQL) statement sent by a client, where the SQL statement is used to request to perform query computation on at least one object in a database, processing the SQL statement to generate an execute plan, extracting a stored object ID of the at least one object, where the object ID of the at least one object is obtained by encoding the at least one object by calling an encoding interface in a global dictionary table and is stored in a data store, the global dictionary table includes an object ID and object description information of each object in a global object sample space, the object ID of each object is unique in the global object sample space, the object ID and the object description information are in a one-to-one mapping relationship in the global dictionary table, and the global object sample space includes a plurality of correlated object sample spaces in the database, performing query computation based on the execute plan by directly using the object ID of the at least one object, to generate a query result, and returning the query result to the client.

According to the foregoing method, the global dictionary table may be used by a plurality of tables through share encoding, the encoded object ID is unique, and the object ID and the object description information are in a one-to-one mapping relationship. Therefore, decompression is not required after a database object is loaded, an encoding value (to be specific, the object ID) of each object may be directly used to participate in query computation such as join, sort, or aggregate such that string-type computation is optimized as integer-type computation, and computation efficiency is improved.

According to a third aspect, a database management system is provided, including an SQL engine, an execute engine, and a storage engine. The SQL engine is configured to generate a corresponding execute plan based on an SQL statement submitted by a client. The SQL statement is used to request to perform query computation on at least one object in a database. The storage engine is configured to store a global dictionary table. The global dictionary table includes an object ID and object description information of each object in a global object sample space. The object ID of each object is unique in the global object sample space. The object ID and the object description information are in a one-to-one mapping relationship in the global dictionary table. The global object sample space includes a plurality of correlated object sample spaces in the database. The execute engine is configured to extract the object ID of the at least one object stored in the storage engine, perform query computation based on the execute plan by directly using the object ID of the at least one object to generate a query result, and return the query result to the client.

In a possible design, the storage engine is further configured to create the global dictionary table.

According to a fourth aspect, another database management system is provided. The database management system has various modules for implementing the foregoing method. The database management system may be implemented using hardware or implemented by executing corresponding software by hardware. The hardware or software includes one or more functional modules for implementing the foregoing method. Further, the database management system may include a module configured to perform the method in any possible implementation of the first aspect or the second aspect.

According to a fifth aspect, a database server is provided, including at least one processor and a non-transitory computer-readable medium storing executable code. The executable code is configured to perform the foregoing method when the executable code is executed by the at least one processor.

According to a sixth aspect, a database system is provided, including a client and any one of the foregoing database management systems.

According to a seventh aspect, a cluster database system is provided, including a hardware layer, a virtual machine monitor (VMM) running at the hardware layer, and a plurality of virtual machines. The virtual machine runs an executable program based on the VMM and a hardware resource provided by the hardware layer to implement some or all functions of the foregoing database management system.

According to an eighth aspect, a non-transitory computer-readable medium storing an executable program is provided. The executable program includes a program used for implementing functions of the foregoing database management system.

In the foregoing implementations, the database is stored in the data store, and the data store is a hard disk, a magnetic disk, a disk array, or a storage server.

In the foregoing implementations, a same type of objects in the database constitute an object sample space, and the objects include a tuple, a column, or a row.

In the foregoing implementations, the plurality of correlated object sample spaces include at least two correlated columns in the database, and the at least two columns constitute the global object sample space.

In the foregoing implementations, the at least two correlated columns include at least two columns that are synchronously operated during query computation.

In the foregoing implementations, query computation includes at least one of join, sort, and aggregate.

In the foregoing implementations, the global dictionary table is one of a data file, a memory table, a database table, and an index table.

Based on the foregoing technical solutions, in embodiments of the present disclosure, the global dictionary table is used to encode the database object. The global dictionary table may be used by the plurality of tables through share encoding, the encoded object ID is unique, and the object ID and the object description information are in a one-to-one mapping relationship. Further, the database object does not need to be decompressed after being loaded, an encoding value (to be specific, the object ID) of each object may be directly used to participate in query computation such as join, sort, and aggregate such that string-type computation is optimized as integer-type computation, and computation efficiency is improved.

BRIEF DESCRIPTION OF DRAWINGS

To describe the technical solutions in some of the embodiments of the present disclosure more clearly, the following briefly describes the accompanying drawings describing some of the embodiments.

DESCRIPTION OF EMBODIMENTS

The following clearly describes the technical solutions in the embodiments of the present disclosure with reference to the accompanying drawings in the embodiments of the present disclosure. The described embodiments are some but not all of the embodiments of the present disclosure.

A method, a database management system, and a database server provided in the embodiments of the present disclosure may be applied to a standalone database system or a cluster database system. A database system is a relatively ideal data processing system that is developed as required by data processing. The database system usually includes the following three parts, (1) a database (also referred to as DB), which is a set of organized and sharable data stored in a computer for a long term, where data in the database is organized, described, and stored based on a mathematical model, has relatively small redundancy, has relatively high data independence and easy scalability, and can be shared by various users. (2) hardware, including a data store required for data storage, for example, a memory and/or a disk. (3) software, including a database management system (also referred to as DBMS), where DBMS is core software of the database system, and is system software used to scientifically organize and store data, and efficiently obtain and maintain data, and a database engine is a core of the DBMS.

Figure 1A:
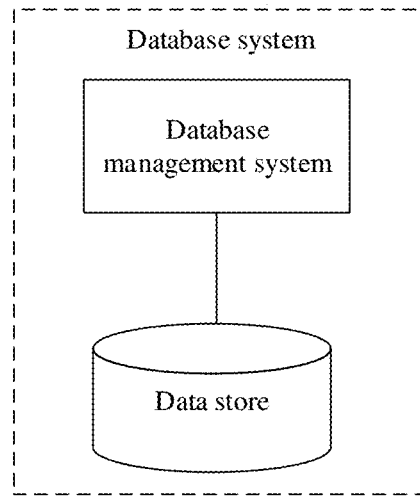
FIG. 1A, FIG. 1B, and FIG. 1C are schematic diagrams of a database system according to an embodiment of the present disclosure.

FIG. 1A is a schematic diagram of a standalone database system, including a database management system and a data store. The database management system is used to provide services such as database querying and modification. The database management system stores data in the data store. In the standalone database system, the database management system and the data store are usually located on a single server, such as a Symmetric Multi-Processor (SMP) server. The SMP server includes a plurality of processors, and all the processors share resources, such as a bus, a memory, and an input/output (I/O) system. A function of the database management system may be implemented by executing a program in the memory by one or more processors.

Figure 1B:
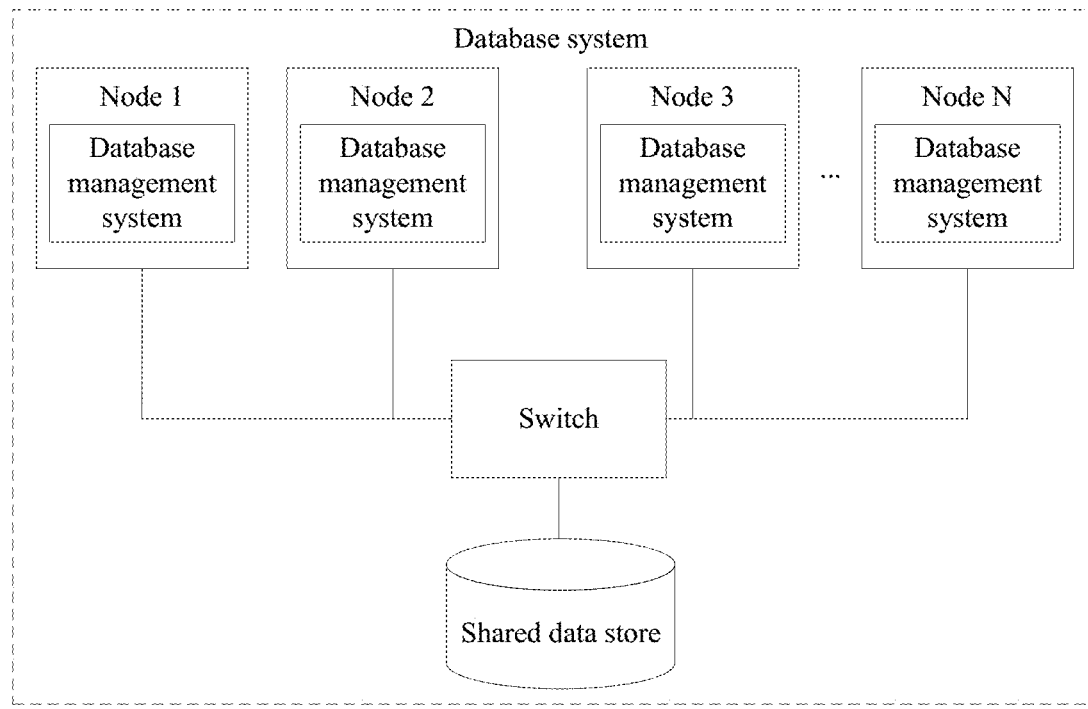

FIG. 1B is a schematic diagram of a cluster database system of a shared-storage architecture, including a plurality of nodes (such as nodes 1-N in FIG. 1B). A database management system is deployed on each node to provide services such as database querying and modification for a user. A plurality of database management systems store shared data in a shared data store, and perform read and write operations on data in the data store using a switch. The shared data store may be a shared disk array. A node in the cluster database system may be a physical machine such as a database server, or may be a virtual machine running on an abstract hardware resource. If the node is a physical machine, the switch is a storage area network (SAN) switch, an Ethernet switch, an optical channel switch, or another physical switch device. If the node is a virtual machine, the switch is a virtual switch.

Figure 1C:
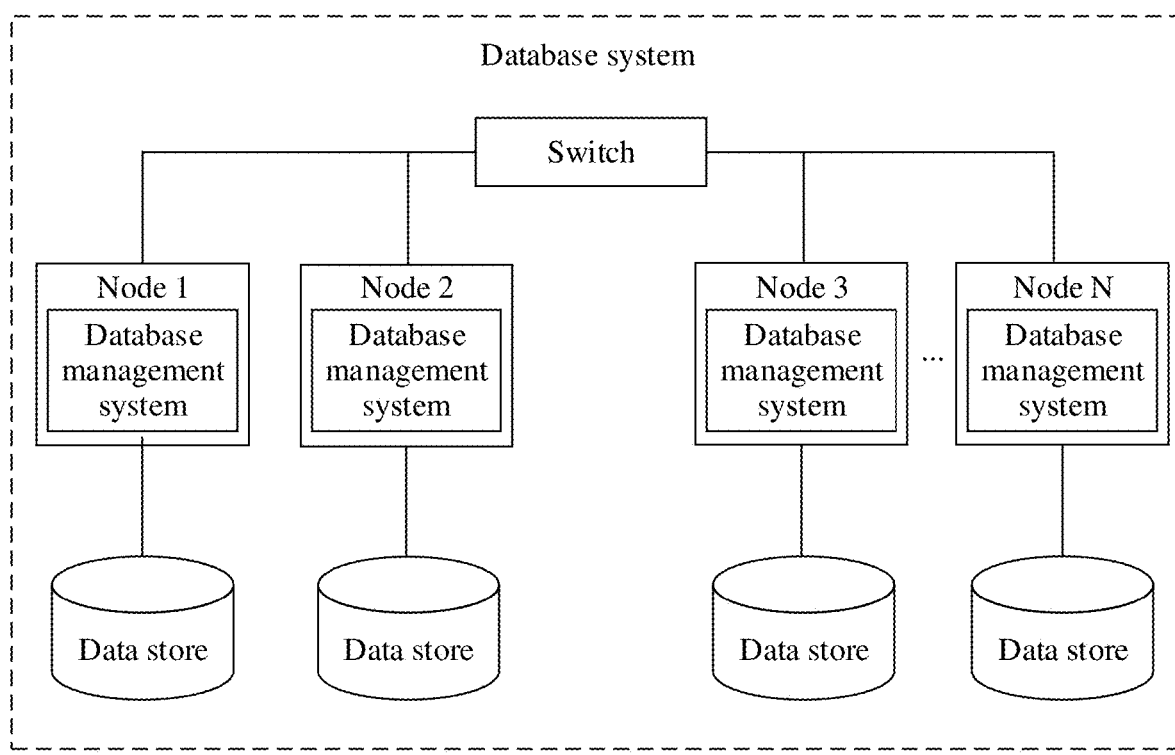

FIG. 1C is a schematic diagram of a cluster database system of a shared-nothing architecture. Each node has an exclusive hardware resource (such as a data store), an operating system, and a database, and nodes communicate with each other using a network. In the system, data is distributed to the nodes based on a database model and an application characteristic. A query task is divided into several portions, to be executed concurrently on all the nodes. All the nodes perform calculation coordinately and are used as a whole to provide a database service. All communications functions are implemented in a high-bandwidth network interconnection system. Similar to that in the cluster database system of the shared-storage architecture described in FIG. 1B, the node herein may be a physical machine or a virtual machine.

In all the embodiments of the present disclosure, the data store of the database system includes but is not limited to a solid-state disk (SSD), a disk array, or another type of non-temporary computer-readable medium. Although a database is not shown in FIG. 1A to FIG. 1C, it should be understood that the database is stored in the data store. A person skilled in the art may understand that the database system may include fewer or more components than those shown in FIG. 1A to FIG. 1C, or include components different from those shown in FIG. 1A to FIG. 1C. FIG. 1A to FIG. 1C merely show components more related to implementations disclosed in the embodiments of the present disclosure. For example, although four nodes are described in FIG. 1B and FIG. 1C, a person skilled in the art may understand that one cluster database system may include any quantity of nodes. A database management system function of each node may be implemented using an appropriate combination of software, hardware, and/or firmware on the node.

For ease of understanding and description, by way of example instead of limitation, the solutions of the embodiments of the present disclosure are described below using one node, to be specific, a database server, in a cluster database system of a shared-nothing architecture as an example. However, a person skilled in the art may clearly understand, based on description of the embodiments of the present disclosure, that the method in the embodiments of the present disclosure may also be applied to a cluster database system of a shared-storage architecture, a stand-alone database system, and any type of relational database system.

Figure 2:
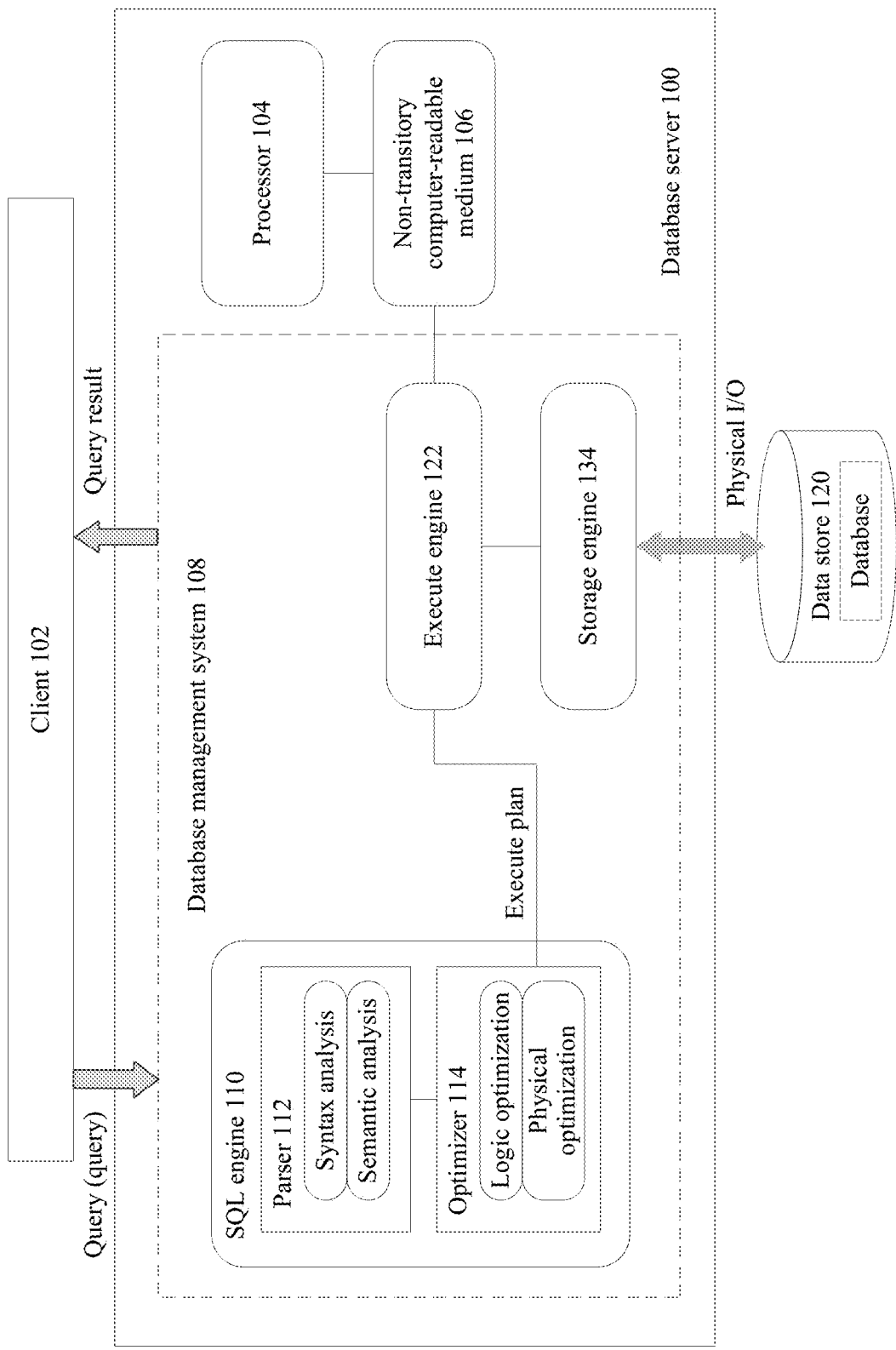
FIG. 2 is a schematic structural diagram of a database server according to an embodiment of the present disclosure.

As shown in FIG. 2, an embodiment of the present disclosure provides a database server 100, including at least one processor 104, a non-transitory computer-readable medium 106 storing executable code, and a database management system 108. The executable code is configured to implement a component and a function of the database management system 108 when executed by the at least one processor 104. The non-transitory computer-readable medium 106 may include one or more nonvolatile memories. For example, the nonvolatile memory includes a semiconductor storage device such as an erasable programmable read only memory (EPROM), an electrically erasable programmable read-only memory (EEPROM), or a flash memory, and a disk such as an internal hard disk, a removable disk, a magneto-optical disk, a compact disc read-only memory (CD ROM), or a digital versatile disc read-only memory (DVD-ROM). In addition, the non-transitory computer-readable medium 106 may further include any device configured as a main memory. The at least one processor 104 may include any type of general-purpose calculation circuit or dedicated logic circuit, such as an field programmable gate array (FPGA) or an application-specific integrated circuit (ASIC). The at least one processor 104 may alternatively be one or more processors coupled to one or more semiconductor substrates, such as a central processing unit (CPU).

The database management system 108 may be a relational database management system (also referred to as RDBMS). The database management system 108 supports an SQL. Usually, the SQL is a dedicated programming language dedicated for managing data stored in a relational database. The SQL may be any type of data-related language, including a data definition language and a data manipulation language. Functions of the SQL may include data insertion, querying, updating, and deletion, mode creation and modification, and data access control. In addition, in some examples, the SQL may include description related to various language elements, including a clause, an expression, a predicate, a query, and a statement. For example, the clause may be various constituents of the statement and the query, and in some cases, the clause may be considered as optional. In addition, the expression may be configured to generate a scalar value and/or a table including a data column and/or row. In addition, a specified condition may be configured for the predicate, to adjust an effect of the statement and the query.

The query is used to request to view, access and/or manipulate data stored in the database. The database management system 108 may receive a query in an SQL format (referred to as an SQL query) from a database client 102. The database management system 108 usually generates, by accessing related data in the database and manipulating the related data, a query result corresponding to the query, and returns the query result to the database client 102. A database is a set of data organized, described, and stored based on a mathematical model. The database may include one or more database structures or formats, such as row storage and column storage. The database is usually stored in a data store, such as an external data store 120 or the non-transitory computer-readable medium 106 in FIG. 2. When the database is stored in the non-transitory computer-readable medium 106, the database management system 108 is a memory database management system.

The database client 102 may include any type of device or application program configured to interact with the database management system 108. In some examples, the database client 102 includes one or more application servers.

The database management system 108 includes an SQL engine 110, an execute engine 122, and a storage engine 134. The SQL engine 110 generates a corresponding execute plan based on an SQL statement submitted by the client 102, such as a query. The execute engine 122 performs an operation based on the execute plan of the statement to generate a query result. The storage engine 134 is responsible for managing actual content of data and an index of a table in a file system, and also manages a cache, a buffer, a transaction, and data such as a log during running of the storage engine 134. For example, the storage engine 134 may write an execution result of the execute engine 122 into the data store 120 through physical I/O. The SQL engine 110 includes a parser 112 and an optimizer 114. The parser 112 is configured to perform syntax and semantic analysis on the SQL statement, expand a query view, and obtain smaller query blocks through division. The optimizer 114 generates, for the statement, a group of execute plans that are possibly used, estimates costs of each execute plan, compares the costs of the plans, and finally selects an execute plan with least costs.

Figure 3:
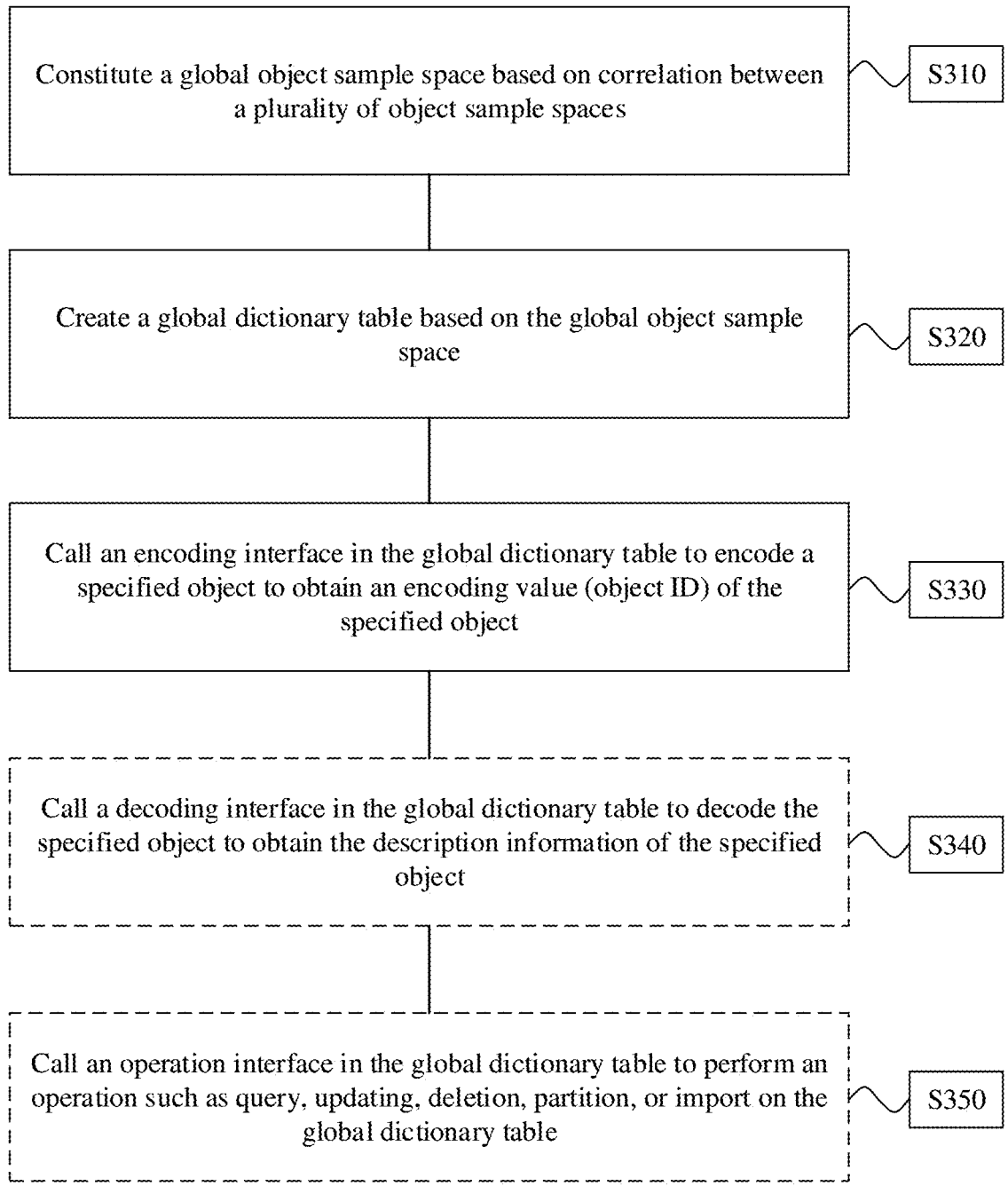
FIG. 3 is a schematic diagram of encoding and compressing an object in a database using a global dictionary table according to an embodiment of the present disclosure.

Based on the database management system 108 described above, as shown in FIG. 3, an embodiment of the present disclosure provides a method for encoding an object in a database using a global dictionary table, and the method includes the following steps.

Step S310: Constitute a global object sample space based on correlation between a plurality of object sample spaces.

Usually, a same type of objects or entities constitute an object sample space. Typically, in a database scenario, an object sample space may be a set of some data in the database, such as a column of data in a table. In this embodiment of the present disclosure, correlated columns or rows are determined from the database to constitute the global object sample space. A basic computation unit in the database is an object, and the basic unit herein includes a tuple, a column/row, and a table. For example, a tuple in each column or row is an object, or a column is an object. Correlated columns are associated columns that are operated simultaneously when query computation is performed in the database. These columns may be in a same table or may be in different tables. Most common join computation in the database is used as an example. Two columns selected when join computation is performed in the database are obviously correlated. Likewise, correlated rows are rows that are operated simultaneously during query computation.

Step S320: Create a global dictionary table in the global object sample space, to (1) provide a globally unique encoding value for each object, and use the encoding value as an object ID of the object, and (2) ensure that the object ID and object description information are in a one-to-one mapping relationship, where the object description information is used to describe or depict a meaning of the object to facilitate user understanding. The object description information is usually in a human language.

Figure 4:
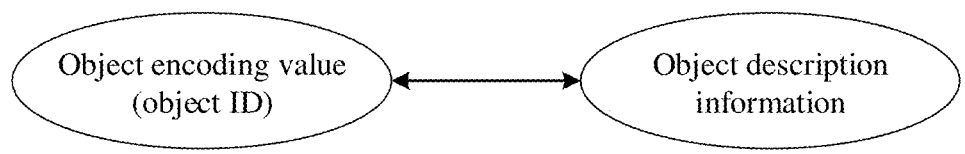
FIG. 4 is a schematic diagram of a global dictionary table according to an embodiment of the present disclosure.

The global dictionary table provides a globally unique encoding value to identify an object, and is used by a plurality of information objects through share encoding. Data inside the global dictionary table mainly includes two sets {object encoding value} and {object description information}. The two parts need to meet a one-to-one mapping constraint shown in FIG. 4. Specific implementation of the global dictionary table is described in detail in the following embodiments.

Step S330: Call an encoding interface in the global dictionary table to encode a specified object to obtain an encoding value (object ID) of the specified object, where the specified object herein may be one or several columns of data in a database.

Optionally, the method further includes the following step.

Step S340: Call a decoding interface in the global dictionary table to decode the specified object to obtain description information of the specified object.

The global dictionary table provides the following two external interfaces.

(1) The encoding interface to enter object description information, and output an integer-type encoding value; and (2) The decoding interface to enter an integer-type encoding value, and output object description information.

The database management system calls the encoding/decoding interface to encode/decode one or more specified objects.

Optionally, the global dictionary table further provides an operation interface. Correspondingly, the method further includes the following step.

Step S350: Call an operation interface in the global dictionary table to perform an operation on the global dictionary table, including but not limited to one or more of operations such as query, updating, deletion, partition, and import.

The global dictionary table is shared by the plurality of tables through share encoding. Therefore, the global dictionary table can provide a globally unique encoding value for column data in these tables, and a column data ID and column description information are in a one-to-one mapping relationship such that creation of a plurality of local dictionary tables is avoided, encoding consumption is reduced, and disk space is saved.

The foregoing method steps are further described using database join computation as an example. If a user selects two columns to perform join computation, because the two columns on which join computation is performed are correlated, a global object sample space may be created for all data in the two columns, and a global dictionary table is used for encoding and decoding:

join_table_1 (join_col_1, . . . , other_cols);
join_table_2 (join_col_2, . . . , other_cols).

The global object sample space constituted by performing join_col_1/join_col_2 is as follows:

$\int_{global\_col}$: {Object=(id, desc)∈ $\int$ global_col∈ $Z$, desc∈ $A$}.

$\int$ global_col is encoded/decoded using the global dictionary table.

Each piece of column data in $\int$ global_col is encoded/decoded using global_dic_table, where global_dic_table (encoding_num, desc_num) is defined as the global dictionary table.

In this way, the global dictionary table provides the encoding value that is used as an ID to uniquely identify each column object such that creation of a plurality of local dictionary tables is avoided, encoding consumption is reduced, and disk space is saved.

An implementation of the global dictionary table includes but is not limited to the following manners:

(1) Data file;

(2) Memory table (represented using a dictionary data structure);

(3) Database table; and (4) Index table.

The memory table may be represented using a dictionary <key, value> data structure. Therefore, a key value in a global dictionary table implemented using the memory table is an encoding value of each object, and a value is description information of each object, as listed in the following.

| Key | Value |
|---|---|
| 1 | '00000000000' |
| 2 | '00000000001' |
| ... | ... |
| 100000 | '13512345678' |
| ... | ... |
| 100000000000 | '99999999999' |

In an example, it is assumed that a string/text that needs to be processed is an 11-digit mobile phone number, and a global dictionary table GLOBAL_DIC may be created using the following function:

```
CREATE TABLE GLOBAL_DIC
(
    MOBILE_NUM CHAR (11) NOT NULL,
    ENCODING_NUM INT NOT NULL
);
```

Mobile phone numbers are grouped based on a number segment. Therefore, the mobile phone number may be further designed as the following partition table to improve query performance:

```
CREATE TABLE GLOBAL_DIC
(
    MOBILE_NUM CHAR (11) NOT NULL,
    ENCODING_NUM INT NOT NULL
)
PARTITION BY RANGE (MOBILE_NUM)
(
PARTITION USELESS_MOBILE_EANGE VALUES LESS THAN
('13500000000'),
PARTITION 135_MOBILE_EANGE VALUES LESS THAN
('13599999999'),
PARTITION 136_MOBILE_EANGE VALUES LESS THAN
('13699999999'),
...
);
```

Further, in an embodiment, an operation interface in the global dictionary table implemented using the memory table is defined as follows:

Add a key/value pair: dic[key]=value/dic.add(key, value);
Remove a key/value pair: dic.remove(key);
Remove all elements: dic.clear( );
Determine whether a specific key is included: dic.find (key);
Determine a key value corresponding to a value: traverse dic to compare values one by one.

The memory table may be stored in the data store 120, and is loaded into the non-transitory computer-readable medium 106 when the memory table is used.

In another embodiment, an operation interface in a global dictionary table implemented using the database table is defined as follows:

(1) Import '00000000000' to '99999999999' and corresponding object ID values of 1 to 100000000000 into the table through batch import or using an insert operation;
(2) Update a record by performing an update operation;
(3) Delete a record by performing a delete operation; and
(4) Query a record in the table by performing a select operation.

After the global dictionary table GLOBAL_DIC is created, an SQL interface complying with the following criteria may be provided to provide an encoding/decoding function externally:

encoding: 11-digit mobile phone number→integer-type encoding value
SELECT ENCODING_NUM FROM GLOBAL_DIC WHERE MOBILE_NUM=?; and decoding: integer-type encoding value→11-digit mobile phone number
SELECT MOBILE_NUM FROM GLOBAL_DIC WHERE ENCODING_NUM=?;

If the global dictionary table is to be used, the global dictionary table may be specified using a table create statement:

```
CREATE TABLE XXX
(
...
) WITH GLOBAL_DIC;
```

Regardless of a used specific implementation, an essential difference between the global dictionary table and an existing local dictionary table lies in that the global dictionary table ensures a full mapping relationship, without depending on existing data, while the local dictionary table creates a mapping relationship merely for existing data.

Further, an encoding interface in the created global dictionary table may be called for encoding. For a global dictionary table implemented as a memory table, if the global dictionary table is to be used to encode, compress, and store a column of 11-digit mobile phone numbers in the table, the following operations need to be performed:

(1) Querying, in the memory table, an ID value corresponding to each of the 11-digit mobile phone numbers in the column; and
(2) Modifying an import SQL statement as follows:
INSERT INTO DST_TABLE SELECT COL1, . . . , IDmobile_num, . . . , COLn FROM FST_TABLE.

As shown in the foregoing SQL, the 11-digit mobile phone number is originally stored in a string type, is replaced with a numeric-type encoding value by querying the memory table, and is inserted into a target table after being compressed.

For a global dictionary table implemented as a database table, if the global dictionary table is to be used to encode, compress, and store a column of 11-digit mobile phone numbers in the table, an import SQL statement needs to be modified as follows.
INSERT INTO DST_TABLE SELECT COL1, . . . , (SELECT ENCODING_NUM FROM GLOBAL_DIC WHERE MOBILE_NUM=COLmobile_num), . . . , COLn FROM FST_TABLE.

As shown in the foregoing SQL, the 11-digit mobile phone number is originally stored in a string type, is converted into a numeric-type encoding value by embedding a subquery, and is inserted into a target table after being compressed.

Figure 5:
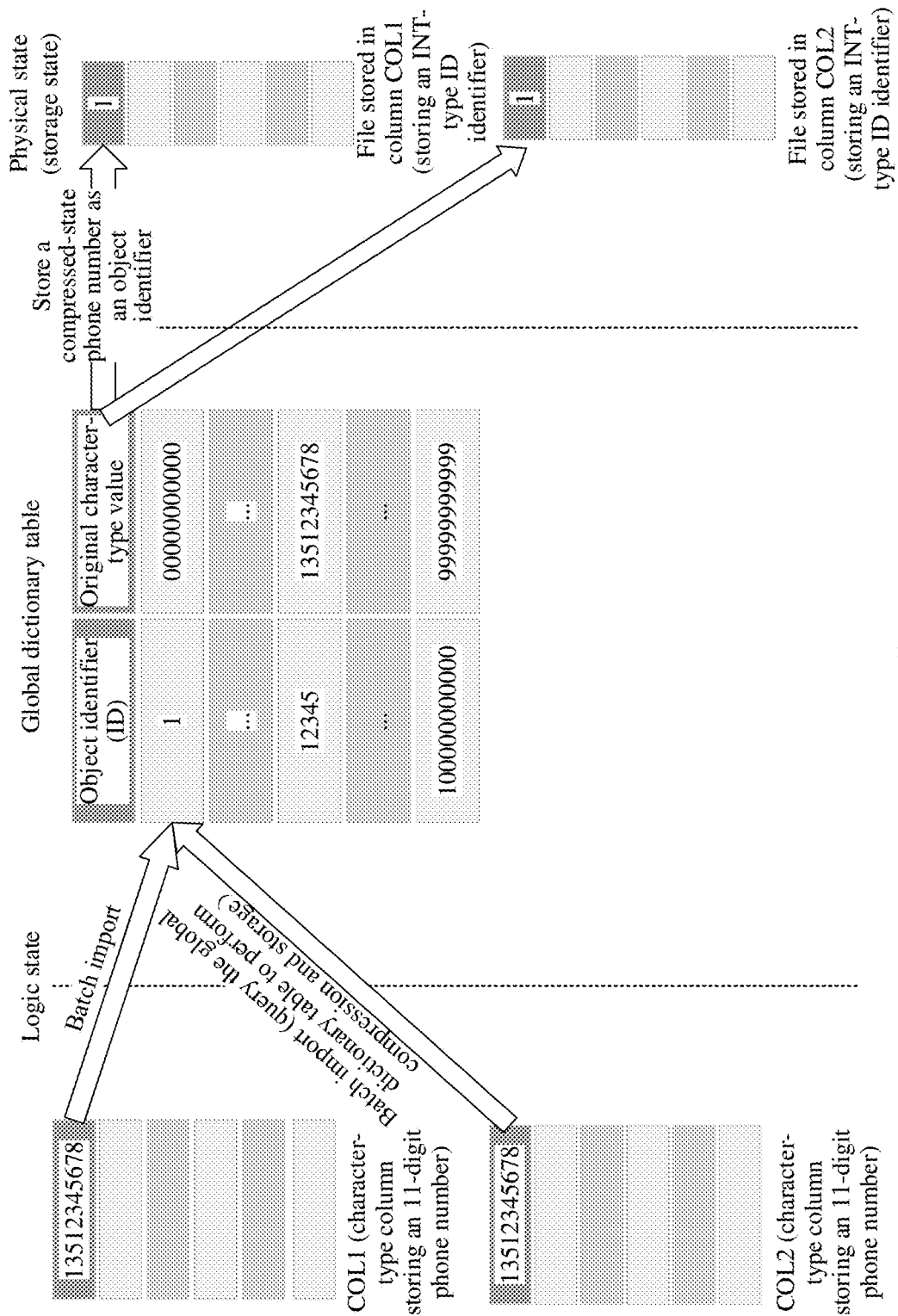
FIG. 5 is a schematic diagram of a process of encoding, compressing, and storing a specified column based on a global dictionary table according to an embodiment of the present disclosure.

As shown in FIG. 5, a specific process in which the database management system 108 encodes, compresses, and stores a specified column based on the global dictionary table includes when a batch import or insertion operation or the like is performed on the table, for specified columns of the table, for example, character-type columns COL1 and COL2 storing 11-digit phone numbers, object IDs are obtained by querying the global dictionary table, and then all object IDs (numeric type) corresponding to all data in the column and that are obtained through query are compressed and stored. In this way, actually stored data is a numeric-type object ID.

Further, the database management system 108 may call a decoding interface in the global dictionary table for decoding. For the global dictionary table implemented as a memory table, if a column needs to participate in computation such as projection in which column data description information is required, a decoding operation may be implemented using the following operations:

(1) Executing an SQL: SELECT COL1, . . . , IDencoding_num, . . . , COLn FROM . . . , to obtain a numeric-type encoding value; and
(2) Obtaining a string-type value of the 11-digit mobile phone number using the encoding value.

For the global dictionary table implemented as a database table, if a column needs to participate in computation such as projection in which column data description information is required, a decoding operation may be similarly implemented by embedding a subquery:
SELECT COL1, . . . , (SELECT MOBILE_NUM FROM GLOBAL_DIC WHERE ENCODING_NUM=COLencoding_num), . . . , COLn FROM . . . .

As shown in the foregoing SQL subquery, an encoding value is used as a subquery condition, and a string-type value of the 11-digit mobile phone number is obtained through decoding in a manner of embedding a query, and finally the 11-digit mobile phone number is output as a projection column. Projection is unary computation, and during the computation, a specified attribute value is selected from the table to constitute a new table.

Figure 6:
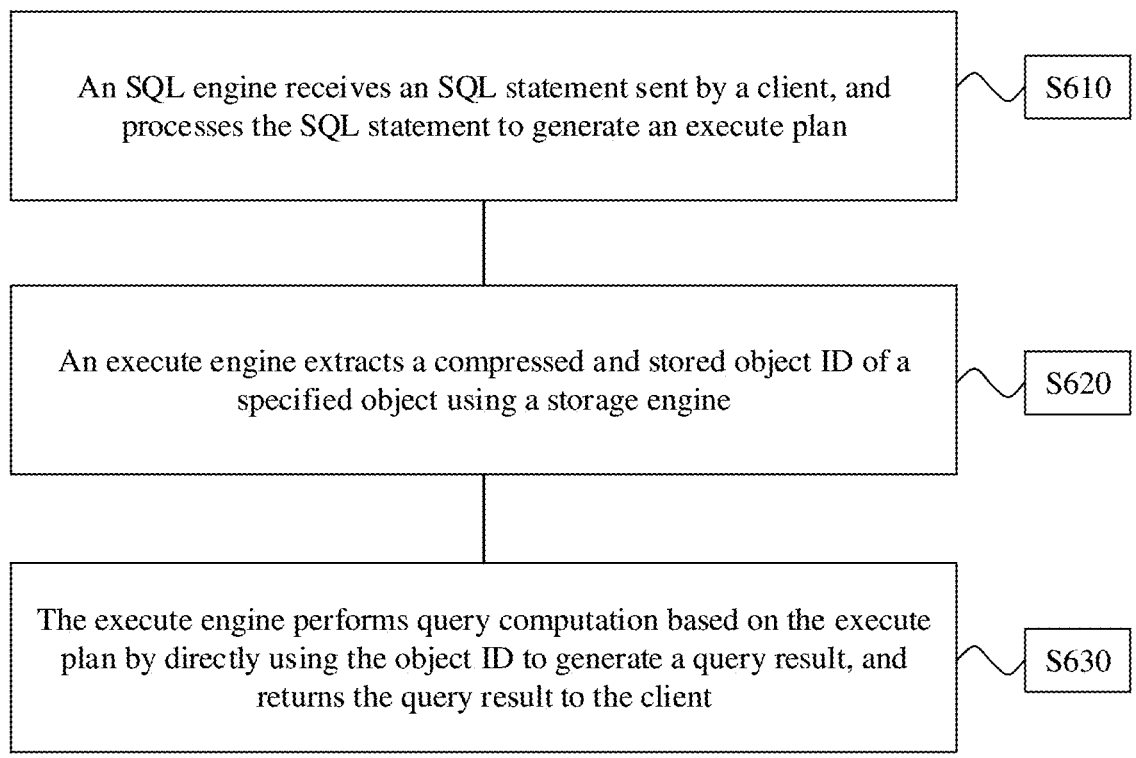
FIG. 6 is a flowchart of a method for performing query computation in a database using an object ID according to an embodiment of the present disclosure.

Because the global dictionary table is shared by a plurality of tables through share encoding, the global dictionary table can provide a globally unique encoding value for column data in these tables. For various types of database query computation, including but being not limited to join, sort, aggregate, and the like, if a column encoded using the global dictionary table does not participate in computation that requires object description information, a column data object ID of the column may be directly used for computation. An ID of column data may be directly used to replace description information of the column data, to perform various types of query computation, without a need to perform query decoding with high costs such that query execution efficiency is improved. Therefore, as shown in FIG. 6, on a basis of encoding and compressing a database object based on the globally shared dictionary table, an embodiment of the present disclosure further provides a method for performing query computation in a database using an object ID, and the method includes the following steps.

Step S610: An SQL engine receives an SQL statement sent by a client, and processes the SQL statement to generate an execute plan, where the SQL statement is used to request to perform query computation on at least one specified object in a database, query computation includes but is not limited to at least one of join, sort, and aggregate, and the specified object herein is usually one or more data columns/rows, in the database, specified using a condition in the SQL statement.

Step S620: An execute engine extracts a compressed and stored object ID of the specified object, where the object ID of the specified object is obtained by encoding and compressing the specified object using the global dictionary table described in the related embodiments of FIG. 3 to FIG. 5, and is stored in a data store using a storage engine.

Step S630: The execute engine performs query computation based on the execute plan by directly using the object ID of the specified object to generate a query result, and returns the query result to the client.

According to the method for performing query computation in a database provided in this embodiment of the present disclosure, based on the share encoding mode provided by the global dictionary table, the object ID is directly used to replace column object description information to perform various types of query computation. A computation granularity changes from various variable-length types to an integer type, and therefore query execution efficiency is greatly improved.

The method for performing query computation by directly using the object ID is described below for several specific application scenarios.

Figure 7:
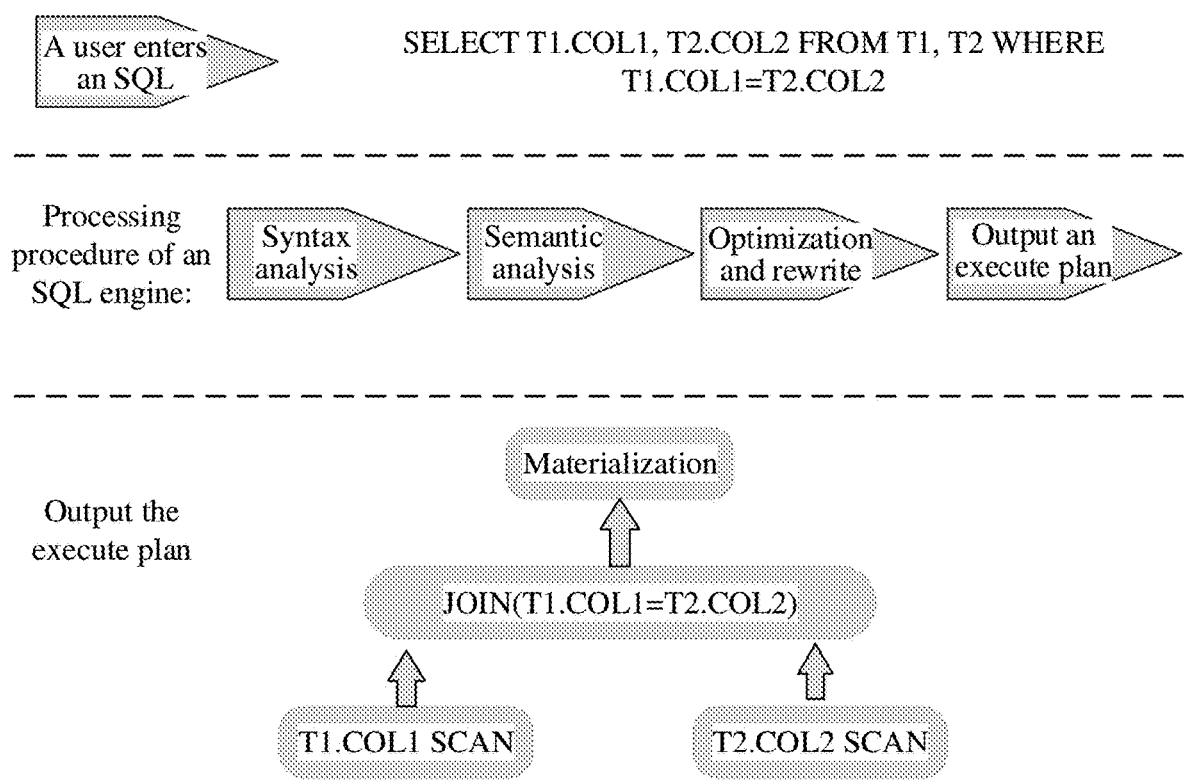
FIG. 7 and FIG. 8 are schematic diagrams of processes of performing equijoin query computation according to an embodiment of the present disclosure.

In an embodiment, referring to FIG. 2 and FIG. 7, it is assumed that a user enters an equijoin SQL statement using the client 102: SELECT T1.COL1, T2.COL2 FROM T1, T2 WHERE T1.COL=T2.COL2 to select same tuples in character-type columns COL1 and COL2 storing 11-digit phone numbers in tables T1 and T2. The SQL engine 110 performs processing such as syntax analysis, semantic analysis, and optimization and rewrite on the SQL statement input by the user to finally generate an execute plan, and transfers the execute plan to the execute engine 122 for computation.

Figure 8:
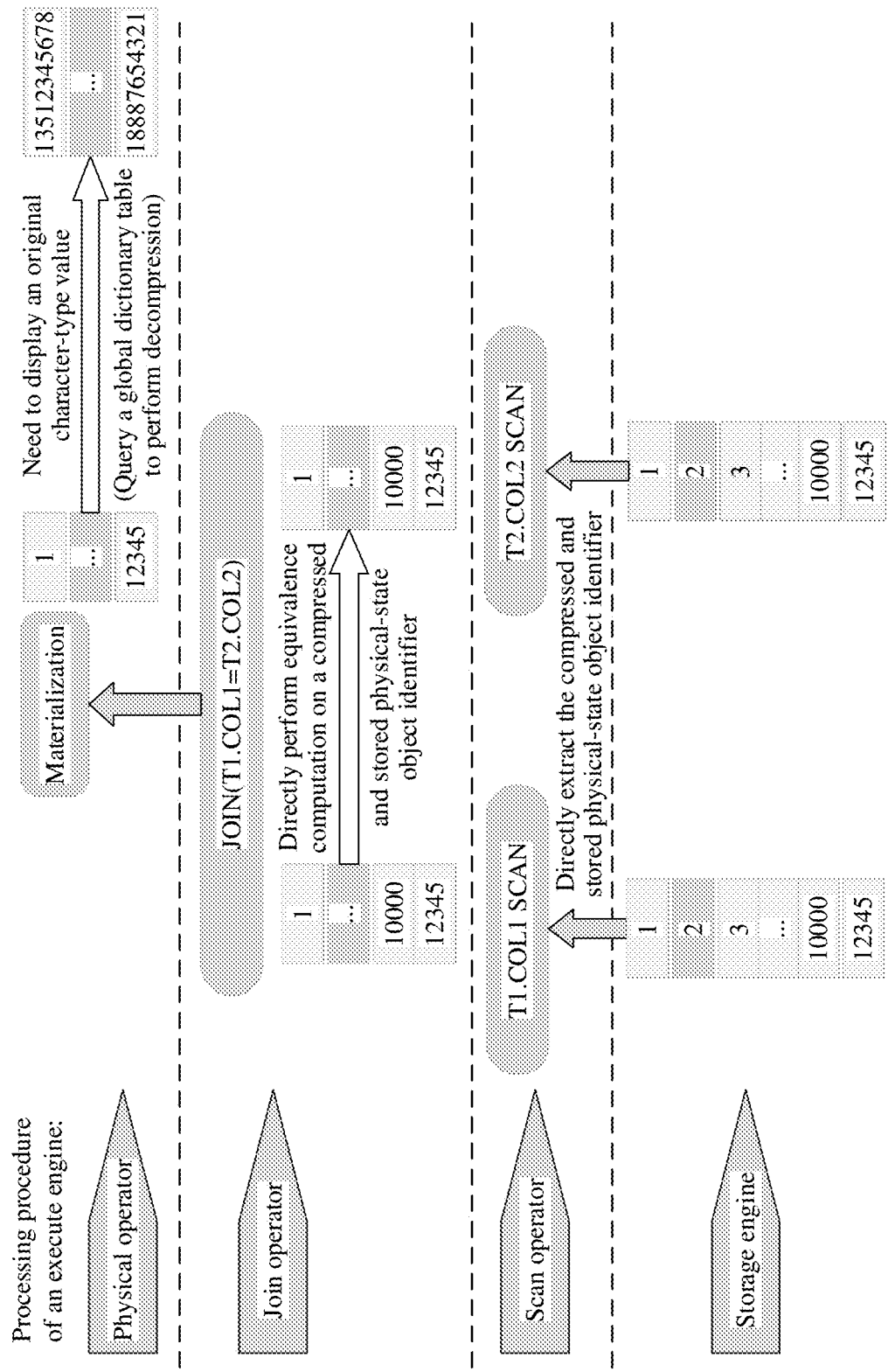
Figure 9:
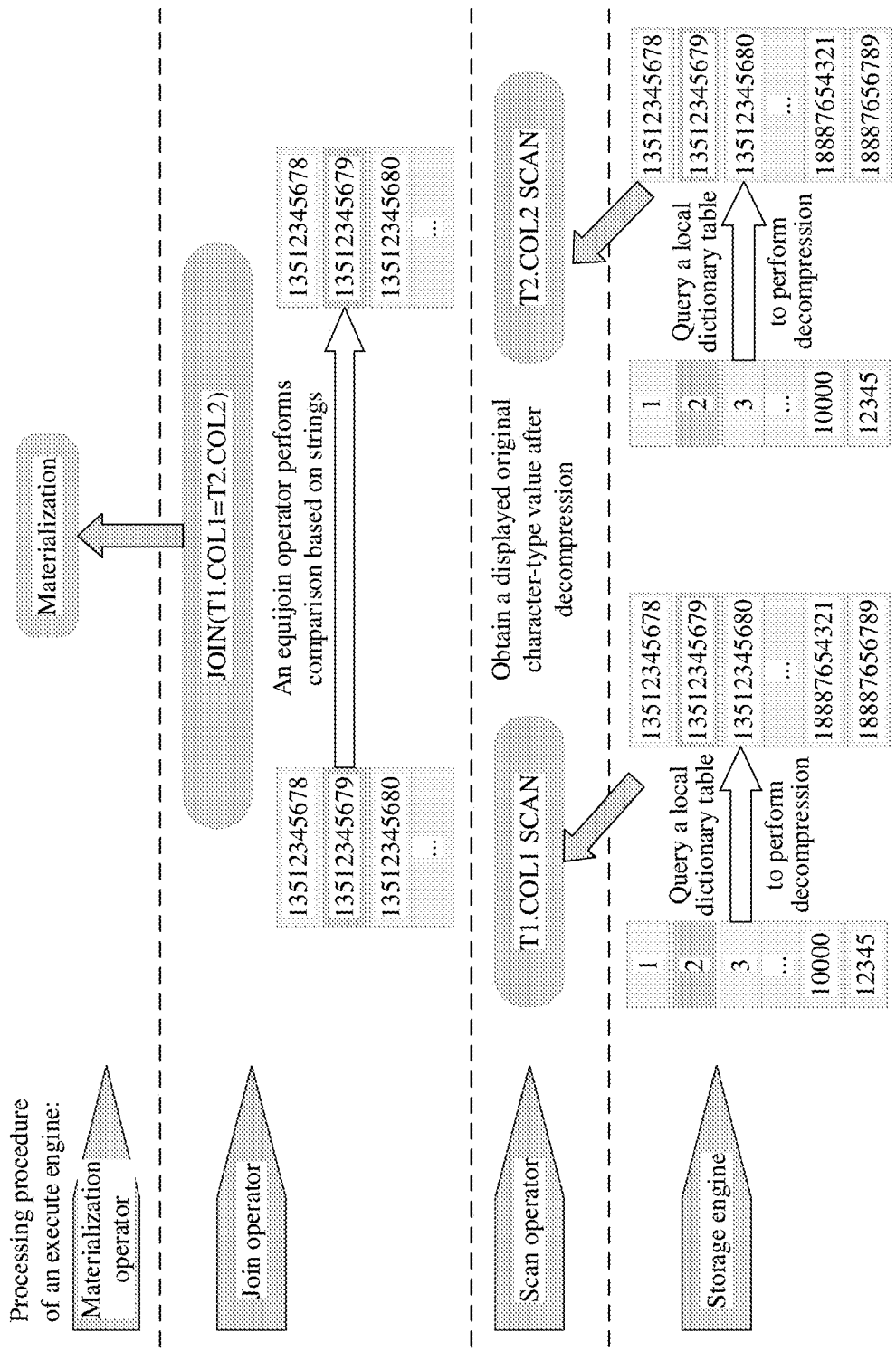
FIG. 9 is a schematic diagram of a process of performing equijoin query computation by an execute engine.

A processing procedure of the execute engine 122 based on the global dictionary table is shown in FIG. 8. When scanning a single table, a scan operator of the execute engine 122 directly extracts, using the storage engine 134, a physically stored compressed-state object ID as a scanning result of the specified columns COL1 and COL2, and transfers the scanning result to a join operator. The join operator directly uses the object ID to perform equijoin computation. Finally, if an original character-type value of an execution result needs to be displayed, a materialization operator queries the global dictionary table to perform decompression in order to obtain an original character-type value corresponding to the object ID. In contrast, if share encoding is not performed on the specified columns COL1 and COL2 using the global dictionary table, a processing procedure of the execute engine 122 is shown in FIG. 9. The storage engine 134 first needs to perform a decompression operation on the columns COL1 and COL2, loading data from the specified columns COL1 and COL2, and reversely querying a local dictionary table to obtain an original character-type value of the 11-digit mobile phone number. Then, a scan operator obtains decompressed original character-type values of the COL1 and the COL2 through scanning, and transfers the decompressed original character-type values to a join operator. The join operator uses the original character-type values of the COL1 and the COL2 to participate in equijoin computation.

It can be learnt by comparing the processing procedures described in FIG. 8 and FIG. 9 that, after share encoding is performed on the data columns using the global dictionary table, the storage engine only needs to store a numeric-type object ID. Further, during equijoin computation, the execute engine can participate in computation by directly using the numeric-type object ID instead of column object description information. Therefore, performance is greatly improved.

Figure 10:
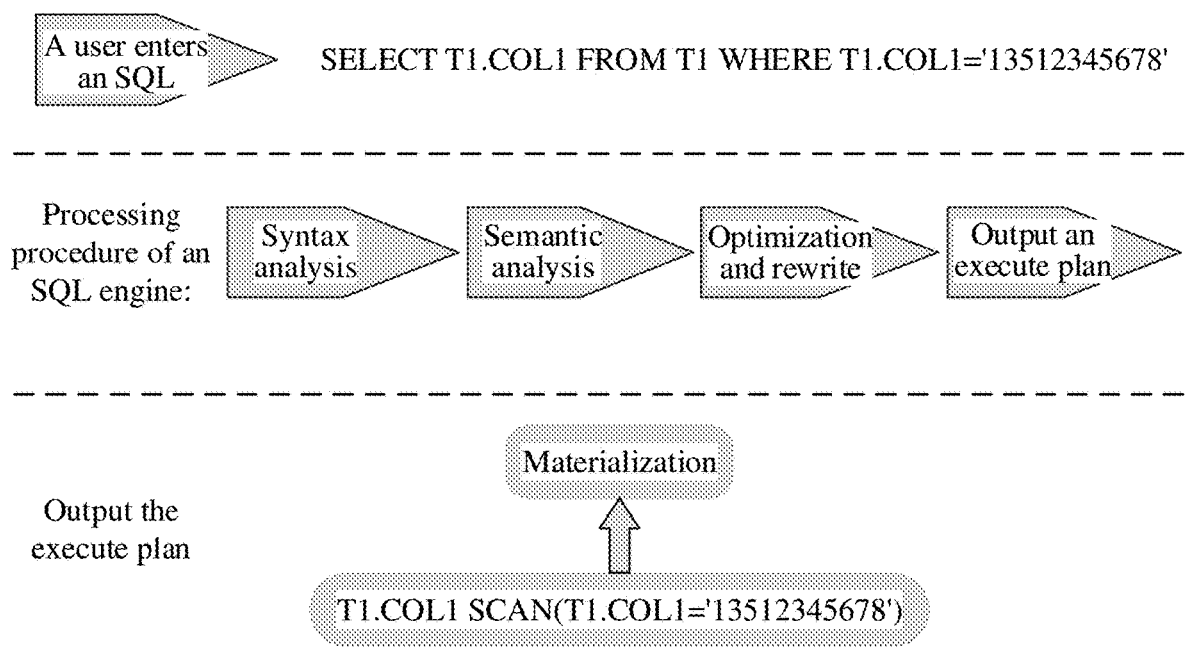
FIG. 10 and FIG. 11 are schematic diagrams of processes of processing an equivalent expression according to an embodiment of the present disclosure.

In another embodiment, referring to FIG. 2 and FIG. 10, if a character value of the 11-digit mobile phone number is stored in the COL1, a user enters an equivalent expression using the client 102: SELECT T1.COL1 FROM T1 WHERE T1.COL1='13512345678'. Similar to that in the embodiment shown in FIG. 7, the SQL engine 110 performs processing such as syntax analysis, semantic analysis, and optimization and rewrite on the equivalent expression, to finally generate an execute plan, and transfers the execute plan to the execute engine 122 for computation.

Figure 11:
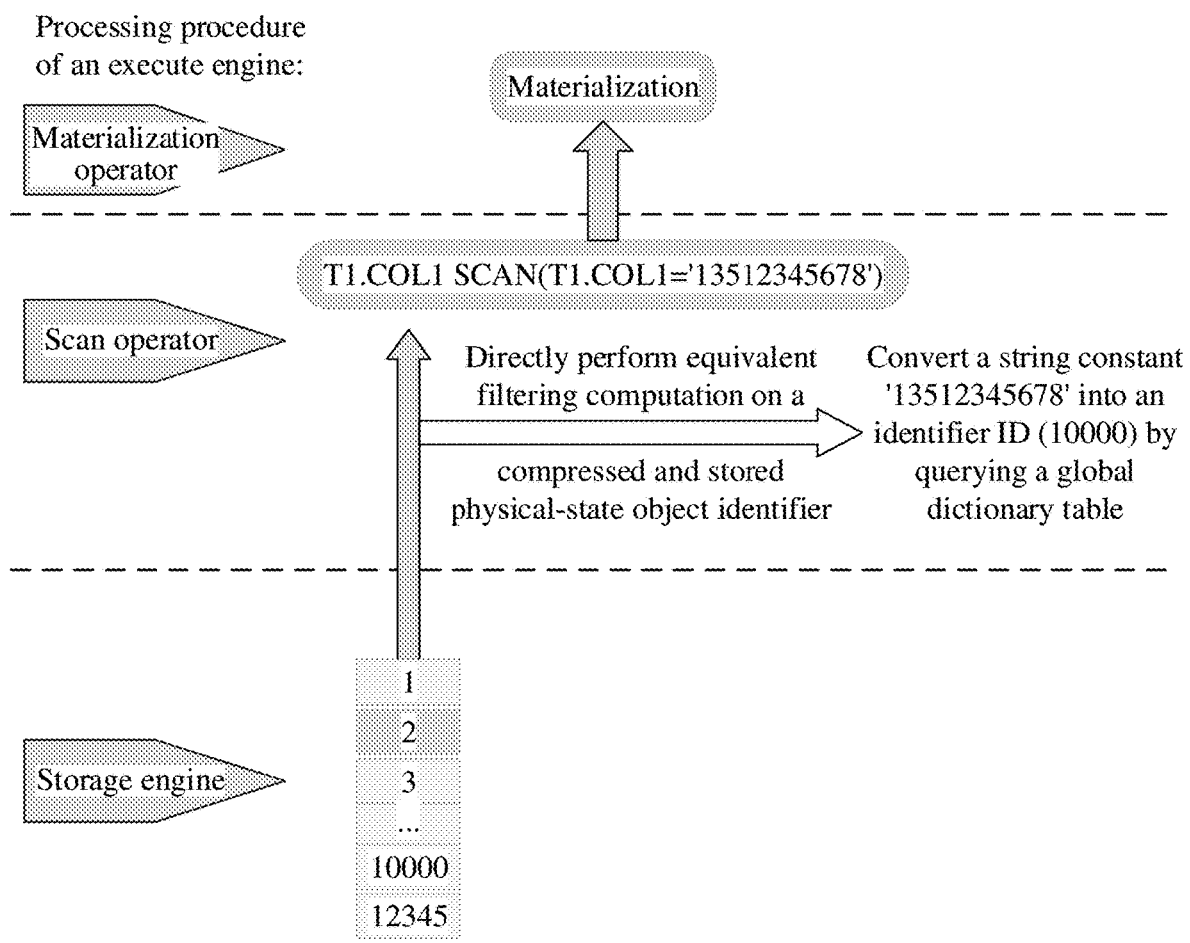
Figure 12:
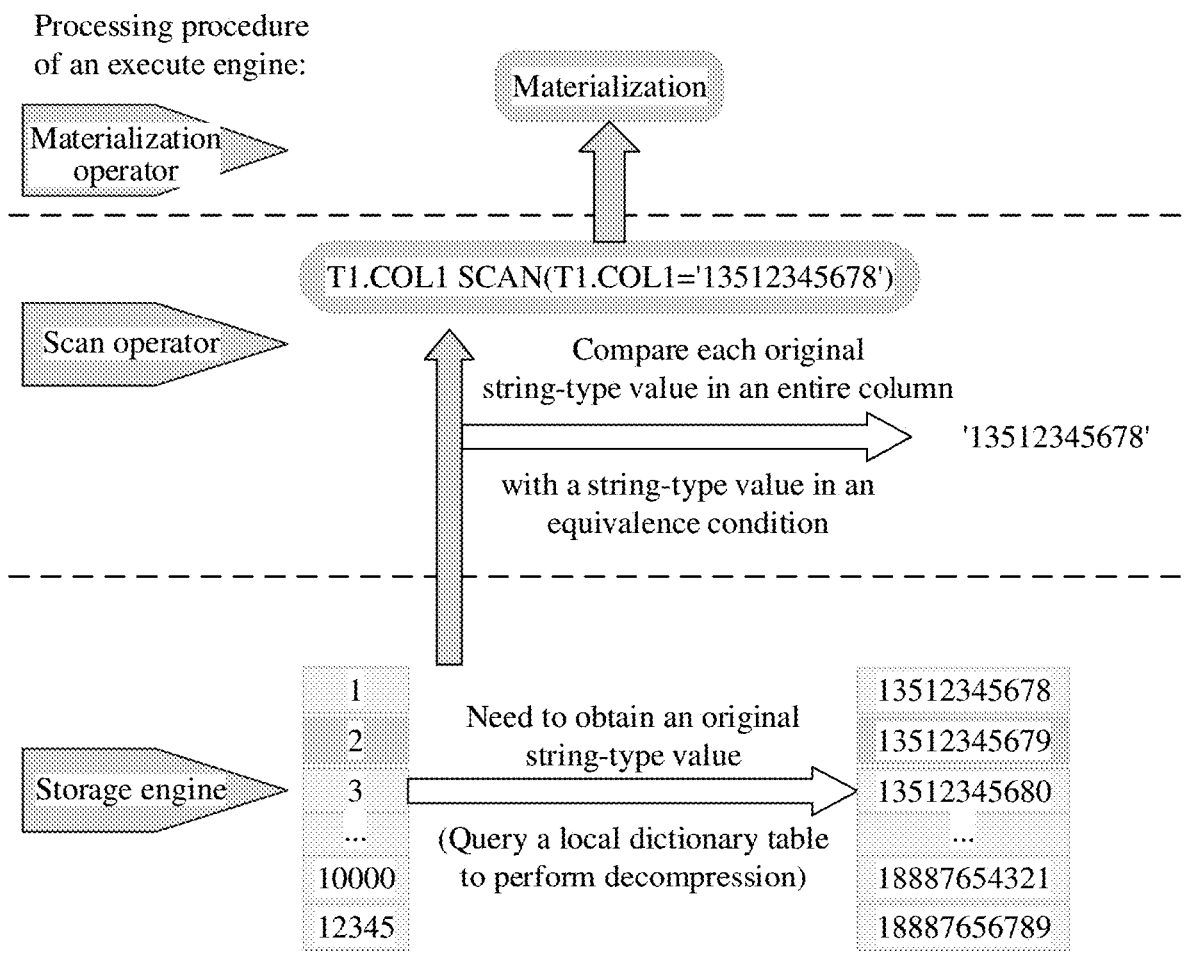
FIG. 12 is a schematic diagram of a process of executing an equivalent expression by an execute engine.

Correspondingly, a processing procedure of the execute engine 122 based on the global dictionary table is shown in FIG. 11. A scan operator converts a string constant '13512345678' in an equivalence condition in the equivalent expression into an object ID (10000) by querying the global dictionary table, then directly performs numeric equivalence comparison between an encoding value in the column COL1 and the object ID (10000) obtained through conversion. In contrast, if the COL1 is encoded/decoded using a local dictionary table instead of the global dictionary table, during equivalent expression computation, as shown in FIG. 12, the storage engine 134 first needs to perform a decompression operation on the column COL1, loading data from the column COL1, and querying the local dictionary table corresponding to the COL1 to obtain an original character-type value of the 11-digit mobile phone number. Then a scan operator of the execute engine 122 performs a string equivalence comparison between original character-type values of all 11-digit mobile phone numbers in the column COL1 and the string constant in the equivalence condition, to obtain a computation result.

It can be learnt by comparing the processing procedures described in FIG. 11 and FIG. 12 that, in the equivalent expression scenario, after a data column is encoded using the global dictionary table, the decompression operation for the column COL1 may not be required, and only the global dictionary table needs to be queried to obtain a string constant ID in the equivalence condition. Therefore, a large quantity of I/O operations is reduced.

Figure 13:
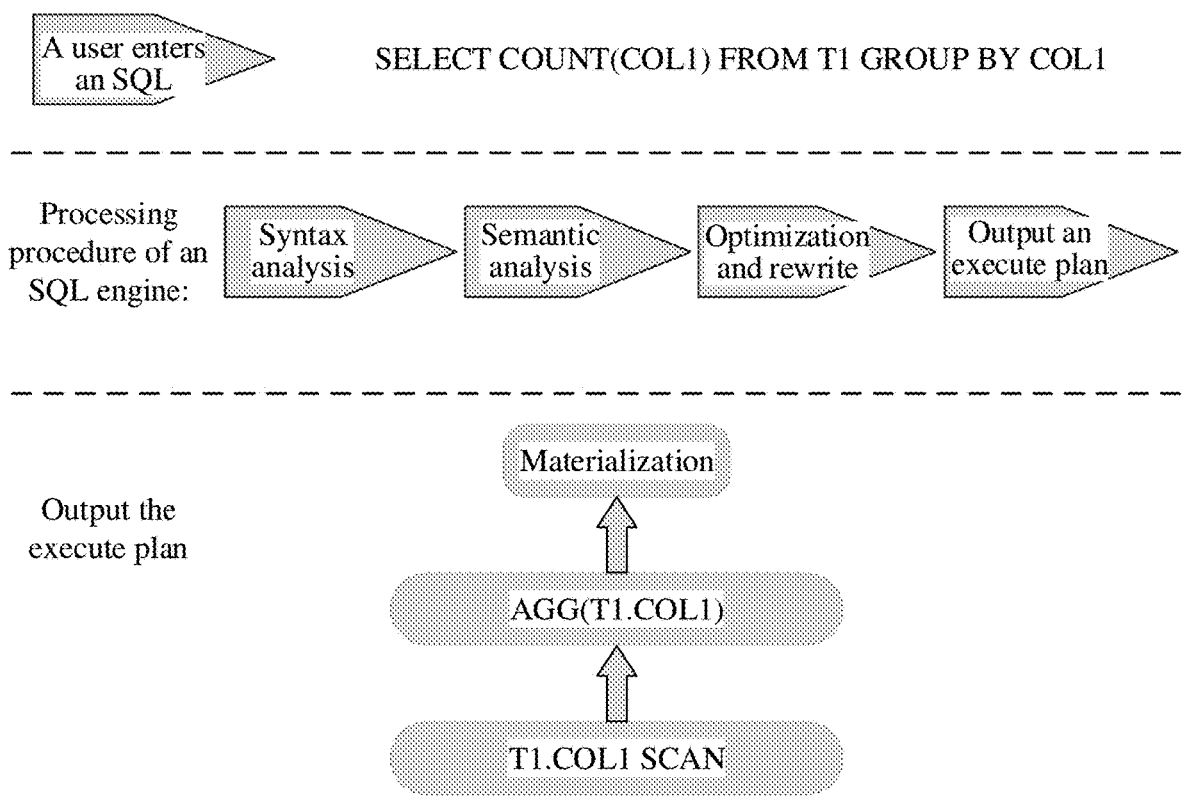
FIG. 13 and FIG. 14 are schematic diagrams of processes of performing group and aggregate computation according to an embodiment of the present disclosure.

In another embodiment, referring to FIG. 2 and FIG. 13, in a group aggregation scenario, if a character value of the 11-digit mobile phone number is stored in the COL1, a user enters an SQL statement using the client 102: SELECT COUNT(COL1) FROM T1 GROUP BY COL1. Similar to that in the embodiments shown in FIG. 7 and FIG. 10, the SQL engine 110 performs processing such as syntax analysis, semantic analysis, and optimization and rewrite on the equivalent expression, to finally generate an execute plan, and transfers the execute plan to the execute engine 122 for computation.

Figure 14:
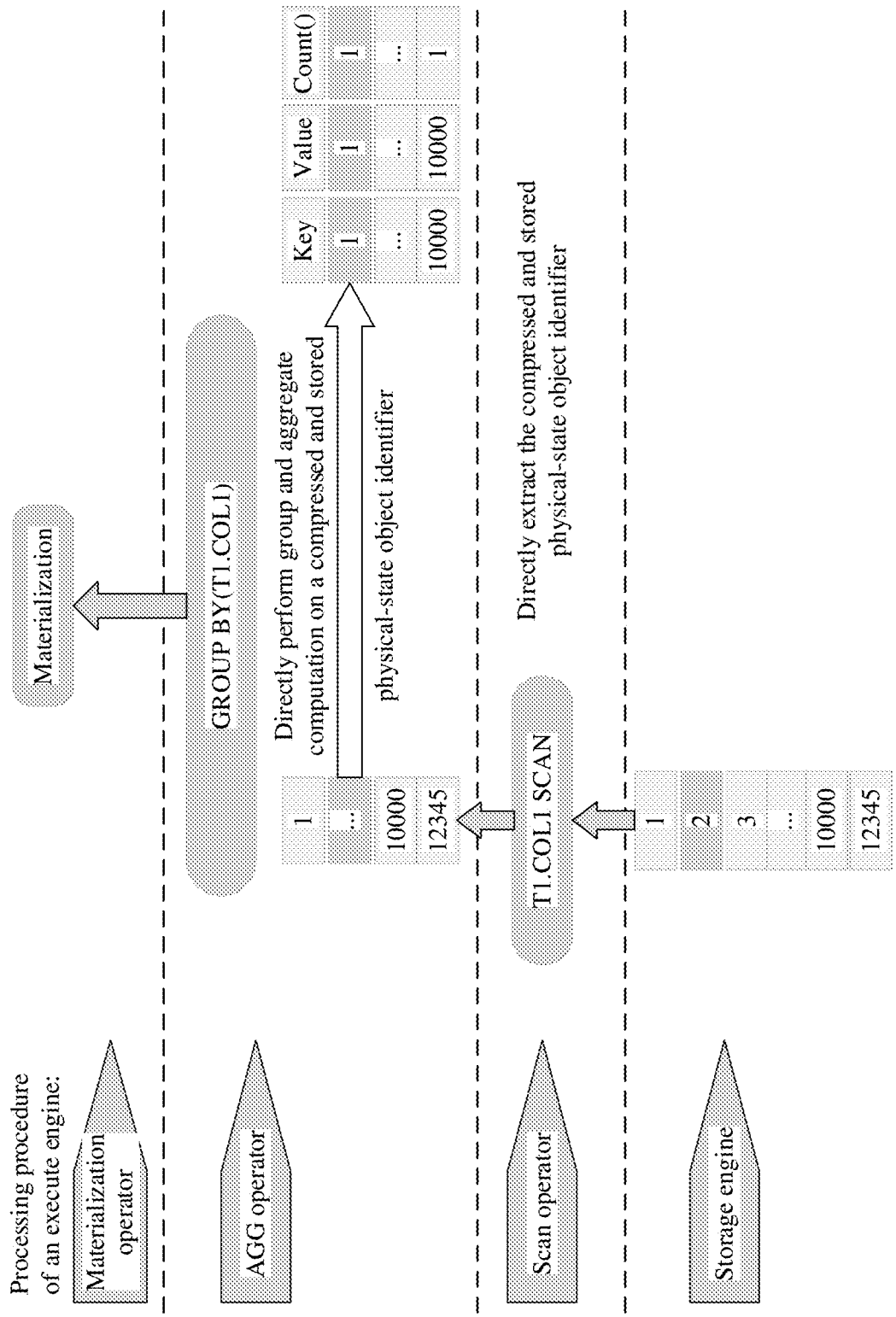
Figure 15:
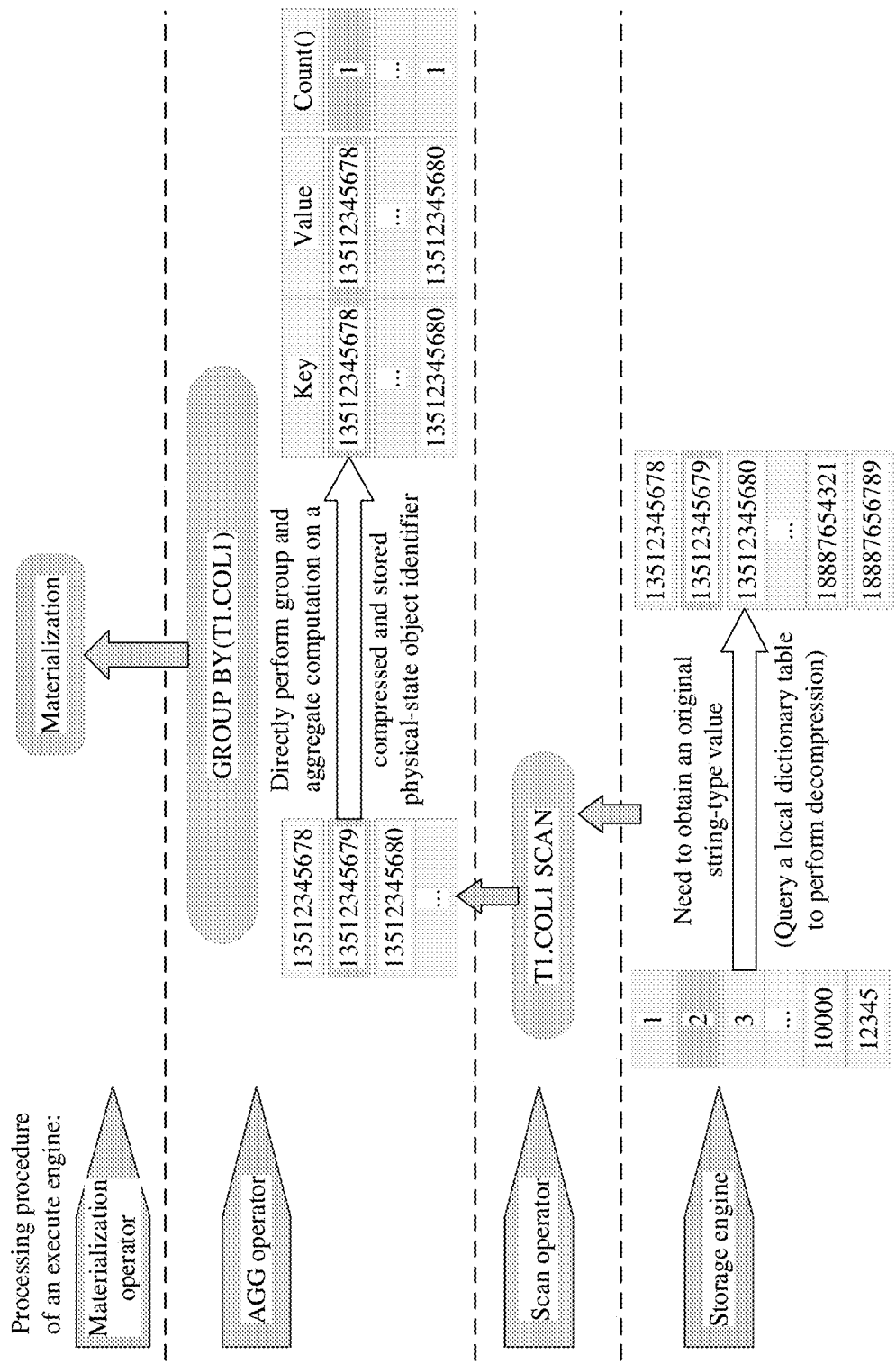
FIG. 15 is a schematic diagram of a process of performing group and aggregate computation.

Correspondingly, a processing procedure of the execute engine 122 based on the global dictionary table is shown in FIG. 14. When scanning a single table, a scan operator directly extracts, using the storage engine 134, a physically stored compressed-state object ID as a scanning result of the column COL1, and transfers the scanning result to an AGG operator. The AGG operator directly uses the object ID to perform group and aggregate computation. Finally, if an original character-type value of an execution result needs to be displayed, a materialization operator queries the global dictionary table to perform decompression in order to obtain an original character-type value corresponding to the object ID. In contrast, if the COL1 is encoded/decoded using a local dictionary table instead of the global dictionary table, during group and aggregate computation, as shown in FIG. 15, the storage engine 134 first needs to perform a decompression operation on the column COL1, loading data from the column COL1, and querying the local dictionary table corresponding to the COL1 to obtain an original character-type value of the 11-digit mobile phone number. Then, the AGG operator performs group and aggregate computation using the decompressed original character-type value of the 11-digit mobile phone number in the column COL1 to obtain a computation result.

It can be learnt by comparing the processing procedures described in FIG. 14 and FIG. 15 that, in the group aggregation scenario, after the data column is encoded using the global dictionary table, an operation of querying the local dictionary table of the column COL1 to decompress the COL1 may not be required. Therefore, a large quantity of I/O operations are reduced.

In another embodiment, in a non-equijoin scenario, for example, a user enters a non-equijoin SQL statement using the client 102 SELECT T1.COL1, T2.COL2 FROM T1, T2 WHERE T1.COL1>T2.COL2. Processing procedures of the SQL engine 110 and the execute engine 122 are basically the same as the procedures in the equijoin scenario described in FIG. 7 and FIG. 8. A main difference lies in that, in the non-equijoin scenario, in addition to one-to-one computation mapping, consistency of computation results further needs to be ensured. Therefore, during creation of the global dictionary table, the following processing is required additionally:

(1) Performing sort processing on the entire global dictionary table; and (2) Setting a sequence number obtained after sorting as an object ID to ensure that a non-equi computation result obtained using the object ID is consistent with a non-equi computation result obtained using an original string type value.

It can be learnt from the examples in the plurality of scenarios that, in this embodiment of the present disclosure, the object in the database is encoded using the global dictionary table. The global dictionary table may be used by a plurality of tables through share encoding, and the encoded object ID is unique, and is in a one-to-one mapping relationship with the object description information. Therefore, the database object does not need to be decompressed after being loaded, an encoding value (to be specific, the object ID) of each object may be directly used to participate in query computation such as join, sort, or aggregate such that string-type computation is optimized as integer-type computation, and computation efficiency is improved.

Comparison between actual performance gains measured by testing a table including 10,000,000 records is as follows.

For join computation, performance gain comparison is as follows.

|  | Other technical solution | Technical solution in the present disclosure | Performance improvement |
| --- | --- | --- | --- |
| Cold data test | 5401 milliseconds (ms) | 4400 ms | 18.5% |
| Hot data test | 3792 ms | 2752 ms | 27.4% |

For join+aggregate computation, performance gain comparison is as follows.

|  | Other technical solution | Technical solution in the present disclosure | Performance improvement |
| --- | --- | --- | --- |
| Cold data test | 28081 ms | 9813 ms | 186.2% |
| Hot data test | 24300 ms | 7093 ms | 242.59% |

The cold data test mainly includes two processes, loading data from a data store, and performing join computation. After the data is loaded into and cached in a memory, the hot data test process performed repeatedly mainly includes a query computation process. It can be learnt from the data in the foregoing tables that beneficial effects of the technical solutions of this application are mainly as follows:

(1) When the object ID instead of the object description information is used in various types of information processing computation, performance is improved greatly;

(2) When the global dictionary table is used to save disk storage space, data loading effect is improved to some extent, and this mainly depends on sizes and storage manners of table data and the global dictionary table; and (3) In comparison with the cold data test, the hot data test has more obvious performance improvement, and more complex computation related to information processing leads to a more obvious performance optimization effect.

Figure 16:
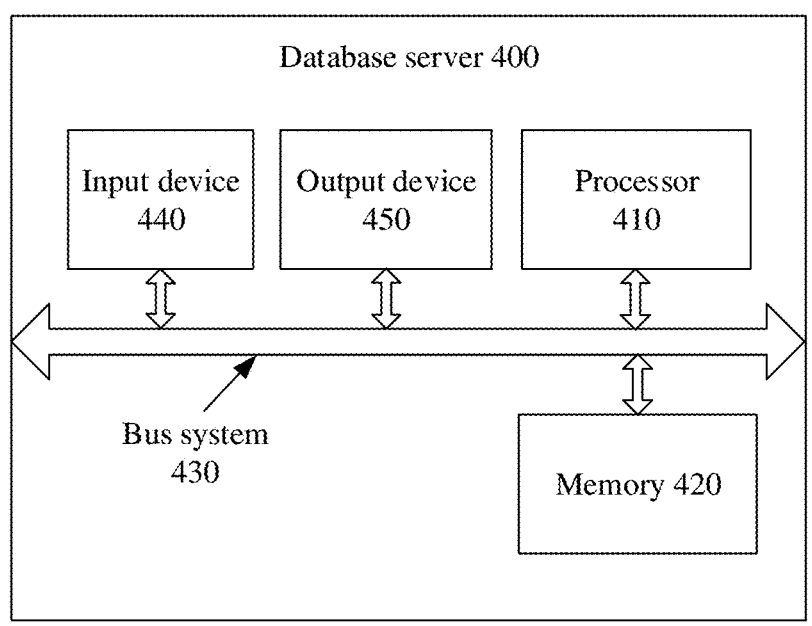
FIG. 16 is a schematic block diagram of another database server according to an embodiment of the present disclosure.

FIG. 16 is a schematic block diagram of another database server 400 according to an embodiment of the present disclosure. The database server 400 includes a processor 410, a memory 420, a bus system 430, an input device 440, and an output device 450.

All components of the database server 400 are coupled together using the bus system 430. In addition to a data bus, the bus system 430 may include a power supply bus, a control bus, a status signal bus, and the like. However, for clear description, various buses are represented using the bus system 430 in the figure.

The processor 410 may include any type of general-purpose calculation circuit or dedicated logic circuit, such as a CPU, an FPGA, or an ASIC. The memory 420 may include only a read-only memory (ROM) and a random access memory (RAM) configured to store data and an executable program. A part of the memory 420 may further include a nonvolatile RAM (NVRAM).

The processor 410 is configured to execute the executable program stored in the memory 420 to implement or perform the method steps described in the method embodiments of the present disclosure, for example, implement some or all functions of the SQL engine and the execute engine in the related embodiments in FIG. 2 to FIG. 14.

It should be understood that, the database server 400 in this embodiment of the present disclosure may correspondingly perform the method for encoding and compressing a database object and the method for performing query computation in a database using an object ID in the embodiments of the present disclosure. In addition, the foregoing and other operations and/or functions of the components of the database server 400 are to implement corresponding procedures in the methods in FIG. 2 to FIG. 14. For brevity, details are not described herein again.

Figure 17:
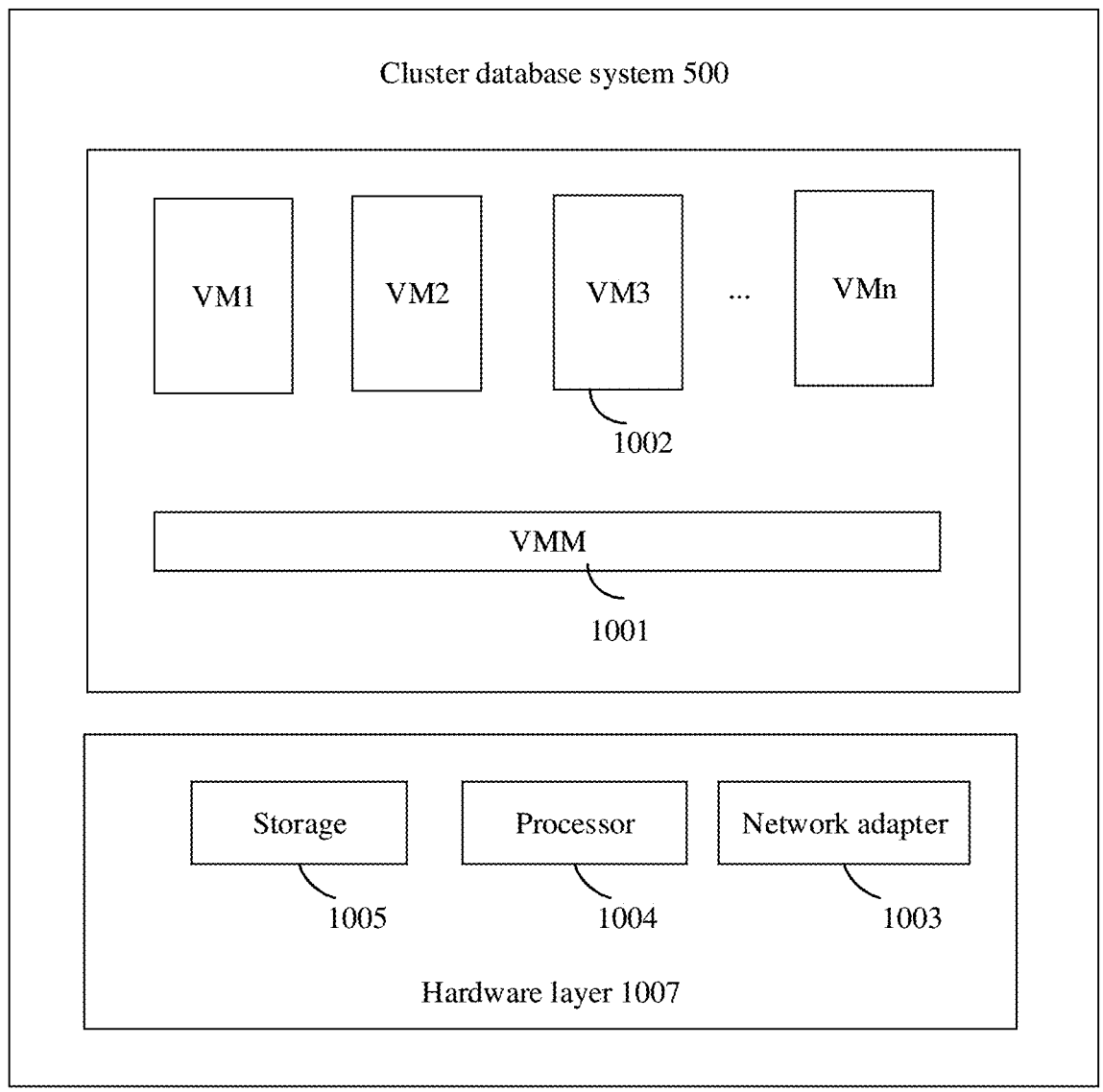
FIG. 17 is a schematic diagram of a cluster database system according to an embodiment of the present disclosure.

Referring to FIG. 17, an embodiment of the present disclosure further provides a cluster database system 500, including a hardware layer 1007, a VMM 1001 running at the hardware layer 1007, and a plurality of virtual machines 1002 (designated as VM1, VM2, VM3, . . . , VMn). One virtual machine may be used as a data node of the cluster database system 500. Optionally, one virtual machine may be further specified as a coordinator node.

Further, the virtual machine 1002 is a virtual computer simulated on a common hardware resource using virtual machine software. An operating system and an application program may be installed on the virtual machine, and the virtual machine may further access a network resource. For an application program running on the virtual machine, the virtual machine works like in a real computer.

The hardware layer 1007 is a hardware platform for virtual environment running, and may be obtained by abstracting hardware resources of one or more physical machines. The hardware layer may include a plurality of types of hardware, for example, a processor 1004 (such as a CPU) and a storage 1005, and may further include a network adapter 1003 (such as an remote direct memory access (RDMA) network adapter), a high-speed/low-speed I/O device, and another device with a specific processing function.

The virtual machine 1002 runs an executable program based on the VMM and a hardware resource provided by the hardware layer 1007, to implement some or all functions of the SQL engine and the execute engine in the related embodiments in FIG. 2 to FIG. 14. For brevity, details are not described herein again.

Further, the cluster database system 500 may further include a host. The host, serving as a management layer, is configured to manage and allocate hardware resources, present a virtual hardware platform for the virtual machine, and implement scheduling and isolation for the virtual machine. The host may be a VMM or a combination of a VMM and one privileged virtual machine. The virtual hardware platform provides various hardware resources for each virtual machine running on the virtual hardware platform, for example, provides a virtual processor (such as a VCPU), a virtual memory, a virtual disk, and a virtual network adapter. The virtual disk may be corresponding to a file or a logical block device of the host. The virtual machine runs on the virtual hardware platform prepared by the host for the virtual machine. One or more virtual machines run on the host. The VCPU of the virtual machine 1002 executes the executable program stored in the virtual memory corresponding to the VCPU to implement or perform the method steps described in the method embodiments of the present disclosure, for example, to implement some or all functions of the SQL engine and the execute engine in the related embodiments in FIG. 2 to FIG. 14.

Figure 18:
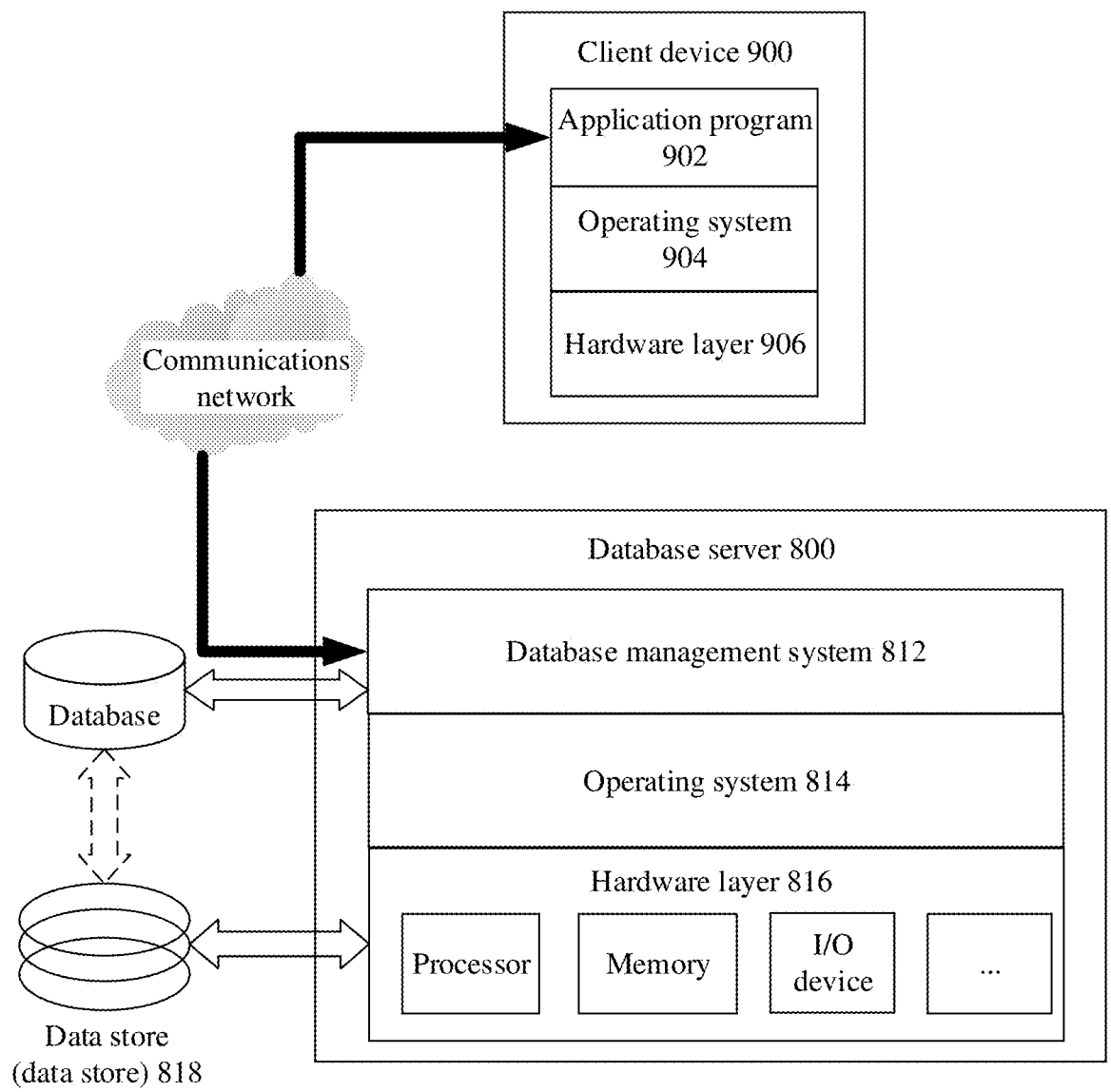
FIG. 18 is a schematic diagram of a database system according to an embodiment of the present disclosure.

Referring to FIG. 18, an embodiment of the present disclosure further provides a database system, including a database server 800 and a client device 900 connected to the database server 800 using a communications network.

A client operating system 904 runs at a hardware layer 906 of the client device 900, and an application program 902 runs in the operating system 904. An operating system 814 runs at a hardware layer 816 of the database server 800, and a database management system 812 runs in the operating system 814. The application program 902 is connected, using the communications network, to the database management system 812 running on the database server 800, and accesses or operates a database stored in a data store 818, for example, queries, updates, or deletes data in the database using an SQL statement, or imports new data into the database.

The hardware layers 906 and 816 include basic hardware units required for running the operating system and the application program, for example, include a processor such as a CPU, a memory, an I/O device, and a network interface.

The data store 818 may be an external storage of the database server 800, such as a hard disk, a magnetic disk, a storage array, or a storage server, and is communicatively connected to the database server 800. Alternatively, the data store 818 may be internally integrated into the database server 800, and exchange data with a processor and an I/O device using a bus or in another internal communication manner.

A memory of the database server 800 stores executable code, and when executed by the processor, the executable code is configured to implement a component and a function of the database management system 812. The database management system 812 may be further the database management system 108 shown in FIG. 2. For a related function and implementation details, refer to the embodiments in FIG. 2 to FIG. 15. Details are not described herein again.

It should be understood that, in the various embodiments of the present disclosure, "executable program" should be widely interpreted as including but being not limited to an instruction, an instruction set, code, a code segment, a subprogram, a software module, an application, a software package, a thread, a process, a function, firmware, middleware, and the like. Sequence numbers of the foregoing method steps described in the foregoing embodiments do not mean execution sequences. The execution sequences of the processes should be determined based on functions and internal logic of the processes, and should not be construed as any limitation on the implementation processes of the embodiments of the present disclosure.

A person of ordinary skill in the art may be aware that, in combination with the examples described in the embodiments disclosed in this specification, units and algorithm steps may be implemented using hardware or a combination of computer software and hardware. Whether the functions are performed using hardware or software depends on specified applications and design constraint conditions of the technical solutions. A person skilled in the art can implement the described functions using different methods for each specific application.

It can be clearly understood by a person skilled in the art that, for ease and brevity of description, for a specific working process of the foregoing database server, database management system, and database system, refer to a corresponding process in the foregoing method embodiments. Details are not described herein again.

In the several embodiments provided in this application, it should be understood that the disclosed system, apparatus, and method can be implemented in other manners. For example, the described apparatus embodiment is merely an example. For example, the unit division is merely logical function division and may be other division in actual implementation. For example, a plurality of units or components may be combined or integrated into another system, or some features may be ignored or may not be performed. In addition, the displayed or discussed mutual couplings or direct couplings or communication connections may be implemented through some interfaces, indirect couplings or communication connections between the apparatuses or units, or electrical connections, mechanical connections, or connections in other forms.

The units described as separated parts may or may not be physically separated, and parts displayed as units may or may not be physical units, may be located in one location, or may be distributed on a plurality of network units. Some or all of the units may be selected depending on actual requirements to achieve the objectives of the solutions of the embodiments. In addition, functional units in the embodiments of the present disclosure may be integrated into one processing unit, or each of the units may exist alone physically, or two or more units are integrated into one unit.

When the functions are implemented in a form of a software functional unit and sold or used as an independent product, the functions may be stored in a computer-readable storage medium. Based on such an understanding, the technical solutions of the present disclosure essentially, or the part contributing to the other approaches, or some of the technical solutions may be implemented in a form of a software product. The computer software product is stored in a storage medium, and includes several instructions for instructing a computer device (which may be a personal computer, a server, a network device, or the like) to perform all or some of the steps of the methods described in the embodiments of the present disclosure. The foregoing storage medium includes any medium that can store program code, such as a universal serial bus (USB) flash drive, a removable hard disk, a ROM, a RAM, a magnetic disk, or an optical disc.

What is claimed is:

1. A method for performing a query computation in a database, comprising:
   receiving, from a client, a structured query language (SQL) statement for performing the query computation on an object in the database;
   processing the SQL statement to generate an execution plan;
   encoding the object by calling an encoding interface from a global dictionary table, wherein the global dictionary table is shared by a plurality of different global object sample spaces;
   extracting a stored object identifier (ID) of the object from a data store, wherein the global dictionary table comprises an object ID and object description information of each object in a global object sample space, wherein the object ID of each object is unique in the global object sample space, wherein the object ID and the object description information of each object are in a one-to-one mapping relationship in the global dictionary table, and wherein the global object sample space comprises a plurality of correlated object sample spaces in the database;
   performing the query computation based on the execution plan using the object ID of the object to generate a query result; and
   sending the query result to the client.

2. The method of claim 1, wherein an object sample space comprises objects of a common type in the database, and wherein each of the objects comprises a tuple.

3. The method of claim 1, wherein the correlated object sample spaces comprise at least two correlated columns in the database, and wherein the global object sample space comprises the at least two correlated columns.

4. The method of claim 3, wherein the at least two correlated columns comprise at least two columns that operate synchronously during the query computation.

5. The method of claim 1, wherein the query computation comprises at least one of join, sort, or aggregate.

6. The method of claim 1, wherein the global dictionary table is at least one of a data file, a memory table, a database table, or an index table.

7. A computer program product comprising computer-executable instructions stored on a non-transitory computer-readable medium that, when executed by a processor, cause a database management system to:
   generate an execution plan based on a structured query language (SQL) statement received from a client, wherein the SQL statement requests to perform a query computation on an object in a database;
   store a global dictionary table that is shared by a plurality of different global object sample spaces, wherein the global dictionary table comprises an object identifier (ID) and object description information of each object in a global object sample space, wherein the object ID of each object is unique in the global object sample space, wherein the object ID and the object description information are in a one-to-one mapping relationship in the global dictionary table, and wherein the global object sample space comprises a plurality of correlated object sample spaces in the database;
   extract an object ID of the object stored in the storage;
   perform the query computation based on the execution plan using the object ID of the object to generate a query result; and
   send the query result to the client.

8. The computer program product of claim 7, wherein an object sample space comprises objects of a common type in the database, and wherein each of the objects comprises a tuple.

9. The computer program product of claim 7, wherein the correlated object sample spaces comprise at least two correlated columns in the database, and wherein the global object sample space comprises the at least two correlated columns.

10. The computer program product of claim 9, wherein the at least two correlated columns comprise at least two columns that operate synchronously during the query computation.

11. The computer program product of claim 7, wherein the computer-executable instructions further cause the database management system to create the global dictionary table.

12. The computer program product of claim 7, wherein the global dictionary table is at least one of a data file, a memory table, a database table, or an index table.

13. The computer program product of claim 7, wherein the query computation comprises at least one of join, sort, or aggregate.

14. A database server, comprising:
    a non-transitory computer-readable medium storing executable code; and
    a processor coupled to the non-transitory computer-readable medium and configured to execute the executable code, which causes the processor to be configured to:
       receive, from a client, a structured query language (SQL) statement to perform a query computation on an object in a database;

process the SQL statement to generate an execution plan;
encode the object by calling an encoding interface from a global dictionary table, wherein the global dictionary table tis shared by a plurality of different global object sample spaces;
extract a stored object identifier (ID) of the object from a data store, wherein the global dictionary table comprises an object ID and object description information of each object in a global object sample space, wherein the object ID of each object is unique in the global object sample space, wherein the object ID and the object description information of each object are in a one-to-one mapping relationship in the global dictionary table, and wherein the global object sample space comprises a plurality of correlated object sample spaces in the database;
perform the query computation based on the execution plan using the object ID of the object to generate a query result; and
send the query result to the client.

15. The database server of claim 14, wherein an object sample space comprises objects of a common type in the database, and wherein each of the objects comprises a tuple.

16. The database server of claim 14, wherein the correlated object sample spaces comprise at least two correlated columns in the database, and wherein the global object sample space comprises the at least two columns.

17. The database server of claim 16, wherein the at least two correlated columns comprise at least two columns that operate synchronously during the query computation.

18. The database server of claim 16, wherein the query computation comprises at least one of join, sort, or aggregate.

19. The database server of claim 16, wherein the global dictionary table is either a data file or a memory table.

20. The database server of claim 16, wherein the global dictionary table is either a database table or an index table.

* * * * *